United States Patent
Wang et al.

(10) Patent No.: US 11,810,546 B2
(45) Date of Patent: Nov. 7, 2023

(54) SAMPLE GENERATION METHOD AND APPARATUS

(71) Applicant: BEIJING YUANLI WEILAI SCIENCE AND TECHNOLOGY CO., LTD., Beijing (CN)

(72) Inventors: Dongxiao Wang, Beijing (CN); Mingqi Yang, Beijing (CN); Nan Ma, Beijing (CN); Long Xia, Beijing (CN); Changzhen Guo, Beijing (CN)

(73) Assignee: Beijing Yuanli Weilai Science and Technology Co., Ltd., Beijing (CN)

(*) Notice: Subject to any disclaimer, the term of this patent is extended or adjusted under 35 U.S.C. 154(b) by 0 days.

(21) Appl. No.: 18/253,717

(22) PCT Filed: Nov. 12, 2021

(86) PCT No.: PCT/CN2021/130459
§ 371 (c)(1),
(2) Date: May 19, 2023

(87) PCT Pub. No.: WO2022/105693
PCT Pub. Date: May 27, 2022

(65) Prior Publication Data
US 2023/0317052 A1  Oct. 5, 2023

(30) Foreign Application Priority Data
Nov. 20, 2020 (CN) .......................... 202011309190.7

(51) Int. Cl.
*G10L 15/22* (2006.01)
*G10L 13/02* (2013.01)
*G10L 13/08* (2013.01)

(52) U.S. Cl.
CPC .............. *G10L 13/02* (2013.01); *G10L 13/08* (2013.01)

(58) Field of Classification Search
CPC ....... G10L 15/22; G10L 13/00; G10L 13/033; G10L 15/063; G10L 15/187;
(Continued)

(56) References Cited

U.S. PATENT DOCUMENTS 6,618,699 B1 * 9/2003 Lee ..................... G10L 25/48
704/E11.002
11,514,948 B1 * 11/2022 Nair ..................... G11B 27/036
(Continued)

FOREIGN PATENT DOCUMENTS

| CN | 105336322 A | 2/2016 |
|----|-------------|--------|
| CN | 109817198 A | 5/2019 |

(Continued)

OTHER PUBLICATIONS

"English translation of International Search Report of the China National Intellectual Property Administration", PCT International Application No. PCT/CN2021/130459 completed Jan. 11, 2022, dated Jan. 30, 2022, Beijing China (5 pages).
(Continued)

*Primary Examiner* — Jakieda R Jackson
(74) *Attorney, Agent, or Firm* — Woods Oviatt Gilman LLP; Katherine H. McGuire, Esq.

(57) ABSTRACT

Provided are a sample generation method and apparatus. The sample generation method comprises: acquiring a plurality of text-audio pairs, wherein each text-audio pair contains a text segment and an audio segment; calculating an audio feature of an audio segment of each of the plurality of text-audio pairs, and selecting, by means of screening and according to the audio feature, a target text-audio pair and a splicing text-audio pair corresponding to the target text-audio pair from among the plurality of text-audio pairs; splicing the target text-audio pair and the splicing text-audio pair into a text-audio pair to be tested, and testing the
(Continued)

text-audio pair to be tested; and when the text-audio pair to be tested meets a preset test condition, writing the text-audio pair to be tested into a training database.

16 Claims, 6 Drawing Sheets

(58) Field of Classification Search
CPC ... G10L 2015/025; G10L 13/02; G10L 13/08; G06N 3/08; G06N 20/00; G06F 16/7834; G06F 40/30
See application file for complete search history.

(56) References Cited

U.S. PATENT DOCUMENTS

| | | |
|---|---|---|
| 2006/0229876 A1 | 10/2006 | Aaron et al. |
| 2014/0195227 A1* | 7/2014 | Rudzicz .................. G10H 1/366 704/231 |
| 2016/0111108 A1* | 4/2016 | Erdogan ............. G10L 21/0324 704/226 |
| 2018/0315420 A1* | 11/2018 | Ash ........................ G10L 15/193 |
| 2019/0164627 A1* | 5/2019 | Blocker .................. G16B 15/00 |
| 2020/0175961 A1* | 6/2020 | Thomson ................ G10L 15/28 |

FOREIGN PATENT DOCUMENTS

| | | |
|---|---|---|
| CN | 110310626 A | 10/2019 |
| CN | 112133277 A | 12/2020 |

OTHER PUBLICATIONS

"English translation of Written Opinion of the China National Intellectual Property Administration", PCT International Application No. PCT/CN2021/130459 completed Jan. 27, 2022, dated Jan. 30, 2022, Beijing China (2 pages).

* cited by examiner

BEST AVAILABLE IMAGE

SAMPLE GENERATION METHOD AND APPARATUS

The present application claims priority to Chinese Patent Application No. 202011309190.7, titled "SAMPLE GENERATION METHOD AND APPARATUS", filed on Nov. 20, 2020 with the Chinese Patent Office, which is incorporated herein by reference in its entirety.

FIELD

The present disclosure relates to the technical field of data processing, and in particular to a sample generation method and a sample generation device.

BACKGROUND

With the development of the Internet technology, a speech synthesis technology is used in more and more scenarios. The speech synthesis technology (Text To Speech, TTS) is also referred to as a text-to-speech technology, which is a technology in which a text is converted into a natural speech by the combination of software and hardware. The technology may be implemented by a waveform splicing method, a parameter-based synthesis method, or an end-to-end synthesis method based on a neural network. The waveform splicing method requires a long time for training data to complete speech synthesis. Further, the parameter-based synthesis method can achieve the speech synthesis, but refers to few factors, resulting in an unsatisfactory synthesis result. The end-to-end synthesis method based on a neural network is most widely used in the conventional technology. The end-to-end synthesis method based on a neural network requires a small amount of data, and can achieve the speech synthesis without manual adjustment of a large number of parameters. The end-to-end speech synthesis method requires a smaller amount of data than other methods, but requires a higher quality of the speech data that other methods due to the characteristics of the end-to-end synthesis method based on a neural network, so that the cost of preparing the speech data in the early stage is greatly increased, and the prepared speech data may have imperfect problems, which seriously affects the implementation of the end-to-end speech synthesis method based on a neural network. Therefore, it is urgent to provide an effective solution to solve the above problems.

SUMMARY

In view of this, a sample generation method is provided according to embodiments of the present disclosure. The present disclosure further relates to a sample generation device, a computing device, and a computer readable storage medium, to solve the technical defects existing in the conventional technology.

In a first aspect, a sample generation method is provided according to an embodiment of the present disclosure. The method includes:
- acquiring multiple text-audio pairs, where each text-audio pair includes a text segment and an audio segment;
- calculating, for each text-audio pair among the multiple text-audio pairs, an audio feature of the audio segment of the text-audio pair, and screening out from the multiple text-audio pairs, according to the audio feature, a target text-audio pair and a splicing text-audio pair corresponding to the target text-audio pair;
- splicing the target text-audio pair and the splicing text-audio pair into a to-be-detected text-audio pair, and detecting the to-be-detected text-audio pair; and
- writing the to-be-detected text-audio pair into a training database in a case that the to-be-detected text-audio pair meets a preset detection condition.

Optionally, the acquiring multiple text-audio pairs includes:
- acquiring a target text and an audio corresponding to the target text;
- preprocessing the audio to obtain a target audio, and converting the target text into a phoneme sequence; and
- aligning the phoneme sequence with the target audio, and generating the multiple text-audio pairs according to an alignment processing result.

Optionally, the generating the multiple text-audio pairs according to an alignment processing result includes:
- acquiring a phoneme audio file according to the alignment processing result, and determining a segmentation position of the phoneme audio file;
- segmenting the phoneme audio file according to the segmentation position to obtain a multiple phoneme-audio pairs, where each phoneme-audio pair includes a phoneme segment and an audio segment;
- determining, based on the target text, a text segment corresponding to the phoneme segment of each phoneme-audio pair among the multiple phoneme-audio pairs; and
- generating the multiple text-audio pairs according to the text segment corresponding to the phoneme segment of each phoneme-audio pair and the audio segment of each phoneme-audio pair.

Optionally, the calculating, for each text-audio pair among the multiple text-audio pairs, an audio feature of the audio segment of the text-audio pair includes:
- for each text-audio pair among the multiple text-audio pairs,
- extracting the audio segment of the text-audio pair, and performing a framing process on the audio segment of the text-audio pair, to obtain an audio frame set of the text-audio pair;
- calculating, based on audio frames in the audio frame set of the text-audio pair, a pitch frequency feature and an audio frame feature of the audio segment of the text-audio pair; and
- determining the audio feature of the audio segment of the text-audio pair according to the pitch frequency feature and the audio frame feature of the audio segment of the text-audio pair.

Optionally, the screening out from the multiple text-audio pairs, according to the audio feature, a target text-audio pair and a splicing text-audio pair corresponding to the target text-audio pair includes:
- integrating, for each text-audio pair among the multiple text-audio pairs, the audio segment, the text segment and the audio feature of the text-audio pair to obtain a text-audio package corresponding to the text-audio pair, and writing the text-audio package into a segment database;
- selecting a text-audio package in the segment database as a target text-audio package, and determining a text-audio pair in the target text-audio package as the target text-audio pair; and
- determining a splicing text-audio package based on text-audio packages in the segment database other than the target text-audio package and the audio feature, and determining a text-audio pair in the splicing text-audio package as the splicing text-audio pair.

Optionally, the determining a splicing text-audio package based on text-audio packages in the segment database other than the target text-audio package and the audio feature includes:

selecting the text-audio packages in the segment database other than the target text-audio package to form a to-be-screened text-audio package set;

determining text-audio pairs of to-be-screened text-audio packages in the to-be-screened text-audio package set as to-be-screened text-audio pairs; and screening out the splicing text-audio package from the to-be-screened text-audio package set based on an audio feature of an audio segment of the target text-audio pair and audio features of audio segments of the to-be-screened text-audio pairs.

Optionally, the screening out the splicing text-audio package from the to-be-screened text-audio package set based on an audio feature of an audio segment of the target text-audio pair and audio features of audio segments of the to-be-screened text-audio pairs includes:

determining a first audio feature of the audio segment of the target text-audio pair according to the target text-audio package, and determining, for each of the to-be-screened text-audio pairs, a second audio feature of the audio segment of the to-be-screened text-audio pair according to the to-be-screened text-audio package;

calculating a feature distance between the first audio feature and the second audio feature; and determining a to-be-screened text-audio package to which a to-be-screened text-audio pair whose feature distance is less than a preset distance threshold belongs, as the splicing text-audio package.

Optionally, before the step of splicing the target text-audio pair and the splicing text-audio pair into the to-be-detected text-audio pair and detecting the to-be-detected text-audio pair, the method further includes:

sampling the audio segment of the target text-audio pair to obtain target sampling information, and determining target text information of the text segment of the target text-audio pair; and determining whether the target sampling information and the target text information meet the preset detection condition; where in a case that the target sampling information and the target text information do not meet the preset detection condition, the step of splicing the target text-audio pair and the splicing text-audio pair into the to-be-detected text-audio pair and detecting the to-be-detected text-audio pair is performed.

Optionally, in a case that the target sampling information and the target text information meet the preset detection condition, the target text-audio pair is written into the training database.

Optionally, the splicing the target text-audio pair and the splicing text-audio pair into a to-be-detected text-audio pair includes:

extracting a target text segment and a target audio segment of the target text-audio pair, and extracting a splicing text segment and a splicing audio segment of the splicing text-audio pair;

splicing the target text segment and the splicing text segment into a to-be-detected text segment, and splicing the target audio segment and the splicing audio segment into a to-be-detected audio segment; and forming the to-be-detected text-audio pair based on the to-be-detected text segment and the to-be-detected audio segment.

Optionally, the detecting the to-be-detected text-audio pair includes:

sampling the to-be-detected audio segment to obtain to-be-detected sampling information, and determining to-be-detected text information of the to-be-detected text segment; and detecting the to-be-detected sampling information and the to-be-detected text information based on the preset detection condition; and the writing the to-be-detected text-audio pair into a training database in a case that the to-be-detected text-audio pair meets a preset detection condition includes:

writing the to-be-detected text-audio pair into the training database in a case that both the to-be-detected sampling information and the to-be-detected text information meet the preset detection condition.

Optionally, after the step of splicing the target text-audio pair and the splicing text-audio pair into the to-be-detected text-audio pair and detecting the to-be-detected text-audio pair, the method further includes:

screening out a multi-degree splicing text-audio pair corresponding to the splicing text-audio pair from the multiple text-audio pairs according to the audio feature in a case that the to-be-detected text-audio pair does not meet the preset detection condition; and splicing the multi-degree splicing text-audio pair and the to-be-detected text-audio pair into a multi-degree to-be-detected text-audio pair, and determining whether the multi-degree to-be-detected text-audio pair meets the preset detection condition; where in a case that the multi-degree to-be-detected text-audio pair meets the preset detection condition, the multi-degree to-be-detected text-audio pair is written into the training database; and in a case that the multi-degree to-be-detected text-audio pair does not meet the preset detection condition, the multi-degree splicing text-audio pair is determined as the splicing text-audio pair, the multi-degree to-be-detected text-audio pair is determined as the to-be-detected text-audio pair, and the step of screening out the multi-degree splicing text-audio pair corresponding to the splicing text-audio pair from the multiple text-audio pairs according to the audio feature is performed.

Optionally, after the step of writing the to-be-detected text-audio pair into the training database, the method further includes:

extracting a sample text-audio pair from the training database, where the sample text-audio pair includes a sample text segment and a sample audio segment; and training a speech synthesis model based on the sample text segment and the sample audio segment, to obtain a target speech synthesis model.

In a second aspect, a sample generation device is provided according to an embodiment of the present disclosure. The device includes: an acquisition module, a calculation module, a splicing module and a writing module, where the acquisition module is configured to multiple text-audio pairs, where each text-audio pair includes a text segment and an audio segment;

the calculation module is configured to calculate, for each text-audio pair among the multiple text-audio pairs, an audio feature of the audio segment of the text-audio pair, and screening out from the multiple text-audio pairs, according to the audio feature, a target text-audio pair and a splicing text-audio pair corresponding to the target text-audio pair;

the splicing module is configured to splice the target text-audio pair and the splicing text-audio pair into a to-be-detected text-audio pair, and detect the to-be-detected text-audio pair; and the writing module is configured to write the to-be-detected text-audio pair into a training database in a case that the to-be-detected text-audio pair meets a preset detection condition.

In a third aspect, a computer device is provided according to an embodiment of the present disclosure. The computer device includes a memory and a processor. The memory is configured to store a computer executable instruction. The processor is configured to execute the computer executable instruction to perform a method including the following steps of:

acquiring multiple text-audio pairs, where each text-audio pair includes a text segment and an audio segment;

calculating, for each text-audio pair among the multiple text-audio pairs, an audio feature of the audio segment of the text-audio pair, and screening out from the multiple text-audio pairs, according to the audio feature, a target text-audio pair and a splicing text-audio pair corresponding to the target text-audio pair;

splicing the target text-audio pair and the splicing text-audio pair into a to-be-detected text-audio pair, and detecting the to-be-detected text-audio pair; and writing the to-be-detected text-audio pair into a training database in a case that the to-be-detected text-audio pair meets a preset detection condition.

In a fourth aspect, a computer readable storage medium is provided according to an embodiment of the present disclosure. The computer readable storage medium stores a computer executable instruction that is executed by a processor to perform the steps of the sample generation method. With the sample generation method provided in the present disclosure, multiple text-audio pairs are acquired. For each text-audio pair among the multiple text-audio pairs, an audio feature of the audio segment of the text-audio pair is calculated, and a target text-audio pair and a splicing text-audio pair corresponding to the target text-audio pair are screened out from the multiple text-audio pairs according to the audio feature. Next, the target text-audio pair and the splicing text-audio pair are spliced into a to-be-detected text-audio pair, and the to-be-detected text-audio pair is detected. In a case that the to-be-detected text-audio pair meets a preset detection condition, the to-be-detected text-audio pair is written into a training database, so that the high-quality sample data that meets the usage requirement of the downstream business can be obtained by the splicing process in the sample data preparation stage, saving the resource consumption cost in the data preparation stage. Further, the amount of sample data written into the training database after the splicing process is large, which effectively solves the problem of the small amount of sample data for the downstream business and a poor speech synthesis effect that is caused due to the uneven distribution of audio lengths in the sample data, thereby improving the business processing efficiency of the downstream business.

DETAILED DESCRIPTION OF EMBODIMENTS

Figure 1:
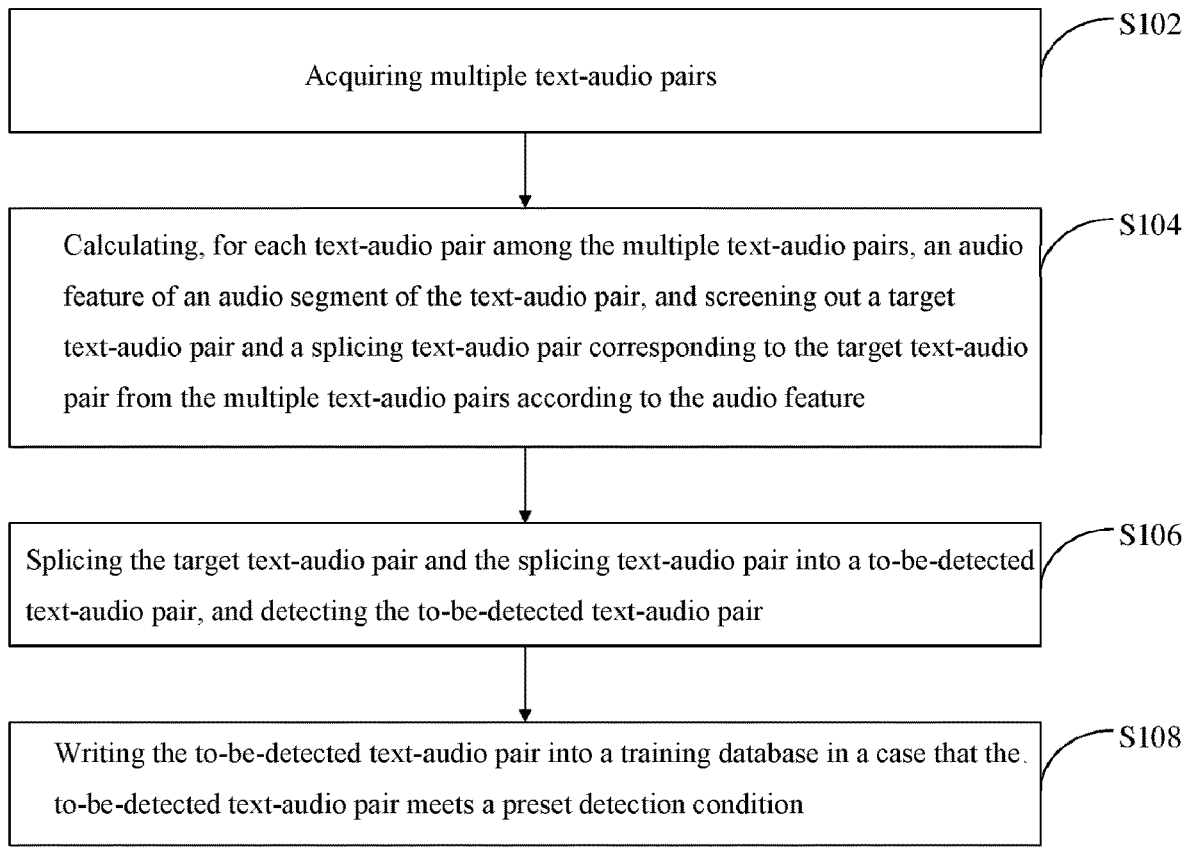
FIG. 1 is a flowchart of a sample generation method according to an embodiment of the present disclosure.

In the following description, many specific details are set forth in order to provide a thorough understanding of present disclosure. The present disclosure may be implemented in many other ways different from those described herein, and those skilled in the art may make similar improvements without departing from the contents of present disclosure. Therefore, the present disclosure is not limited to specific implementations disclosed below.

The terminology used in one or more embodiments of present disclosure is merely used to describe a specific embodiment and is not intended to limit the one or more embodiments of present disclosure. A statement of a singular form such as "a", "the" and "said" as used in the one or more embodiments of the present disclosure and the appended claims is intended to include the plural form as well, unless the context clearly dictates otherwise. It should further be understood that the term "and/or" as used in the one or more embodiments of the present disclosure refers to and includes any and all possible combinations of one or more of associated listed items.

It should be understood that, although the terms such as "first" and "second" are used in the one or more embodiments of present disclosure to describe various information, such information should not be limited by these terms. These terms are merely used to distinguish the same type of information from each other. For example, without departing from the scope of the one or more embodiments of the present disclosure, a "first" may be termed a "second", and similarly a "second" may be termed a "first". Depend on the context, the word "if" as used herein may be interpreted as "at the time of" or "when" or "in response to determining."

Firstly, terminologies involved in the one or more embodiments of the present disclosure are explained below.

A terminology pitch frequency (F0) is described below. A sound is generally composed of a series of vibrations having different frequencies and amplitudes made by a sounding body. A sound generated by a vibration with the lowest frequency among these vibrations is referred to as a pitch, and a frequency corresponding to the pitch is referred to as a pitch frequency.

The Forced Alignment technology is a technology for obtaining a correspondence between a given phoneme sequence and a speech in terms of time, which may be achieved by forced alignment tools. For example, the alignment of the phoneme sequence with an audio is implemented by a tool such as the kaldi (which is an open source speech recognition tool (Toolkit) and implement the decoding algorithm by using the WFST) or the HTK (HMM Toolkit, which is a speech processing tool based on the hmm model).

A phoneme is the smallest phonetic unit divided according to natural properties of speech. In accordance with pronunciation actions in the syllable, each action constitutes a phoneme. The phoneme includes a vowel and a consonant. For example, a Chinese syllable (ā) has only one phoneme, a Chinese syllable (ài) has two phonemes, and a Chinese syllable (dài) has three phonemes. In Chinese, the phoneme refers to a pinyin. Further, in English, the phoneme refers to a phonetic symbol.

A sample generation method is provided in the present disclosure. The present disclosure further relates to a sample generation device, a computing device, and a computer readable storage medium, which are described in detail in the following embodiments.

In practical applications, in the end-to-end speech synthesis method based on a neural network, some high-quality sample data is required to be prepared before the model training due to the characteristics of this method, so as to train a speech synthesis model that meets the usage requirement. The sample data is generally required to be recorded in a professional recording studio, and is trimmed and sorted, to be used for training the model, which not only takes a lot of time to complete the data preparation, but also costs a lot. Further, due to the strict requirements for the sample data, there is less data that can be used to train the model, so that it is difficult to obtain the sample data with comprehensive coverage length and rhythm, resulting in problems of the speech synthesis such as a poor timbre quality and an unnatural rhythm (tone fluctuation). Therefore, how to generate high-quality and property-rich sample data in the sample data preparation stage is an urgent problem to be solved.

A sample generation method is provided in the present disclosure. In this method, multiple text-audio pairs are acquired. For each text-audio pair among the multiple text-audio pairs, an audio feature of the audio segment of the text-audio pair is calculated, and a target text-audio pair and a splicing text-audio pair corresponding to the target text-audio pair are screened out from the multiple text-audio pairs according to the audio feature. Next, the target text-audio pair and the splicing text-audio pair are spliced into a to-be-detected text-audio pair, and the to-be-detected text-audio pair is detected. In a case that the to-be-detected text-audio pair meets a preset detection condition, the to-be-detected text-audio pair is written into a training database, so that the high-quality sample data that meets the usage requirement of the downstream business can be obtained by the splicing process in the sample data preparation stage, saving the resource consumption cost in the data preparation stage. Further, the amount of sample data written into the training database after the splicing process is large, which effectively solves the problem of the small amount of sample data for the downstream business and a poor speech synthesis effect that is caused due to the uneven distribution of audio lengths in the sample data, thereby improving the business processing efficiency of the downstream business.

FIG. 1 shows a flowchart of a sample generation method according to an embodiment of the present disclosure. The method includes the following steps S102 to S108.

In step S102, multiple text-audio pairs are acquired, where each text-audio pair includes a text segment and an audio segment.

Specifically, the text-audio pair refers to a queue formed by a text segment and an audio segment that have a corresponding relationship. The text segment includes but is not limited to a character unit, a word unit, or a sentence unit. The audio segment includes but is not limited to a speech that matches the character unit, the word unit, or the sentence unit.

Based on this, a speech synthesis model is required to be trained in the processing of the downstream business, that is, a model by which a text is converted into an audio is required to be trained. Therefore, a large amount of sample data meeting a usage requirement of the downstream business is required to be prepared in the preparation stage of the sample data. Further, in order to train the speech synthesis model with high prediction accuracy, the sample data is prepared in combination with an audio feature in the data preparation stage, so as to complete the preparation of the sample data of high quality and high quantity at a low consumption cost.

Further, the downstream business requires a large amount of the sample data and has a high quality requirement for the sample data. In a case that the sample data is constructed by manually recording an audio, a relatively long time may be taken, and an attribute coverage is relative small. In order to solve this problem, the preparation of the sample data is implemented by a splicing process in the present disclosure, so that a large amount of the sample data can be spliced for the downstream business. Further, in order to ensure the quality requirements for the sample data, the splicing process is performed in combination with the audio feature, so as to complete the preparation of the sample data. Based on this, in the preparation stage of the sample data, a small amount of texts having different lengths may be prepared, and audios respectively corresponding to these texts may be generated. The sample data to be written in the training database is constructed based on the small amount of texts and the small amount of audios respectively corresponding to the small amount of texts.

In this embodiment, the sample generation method is described by taking any one of the small amount of texts as a target text for example. For the process of generating the sample data meeting the requirements, the corresponding description in this embodiment may be referred to, which is not repeated herein.

In the process of generating the sample data, in order to splice a large number of text-audio pairs that may be written into the training database, the acquired target text and the corresponding audio are segmented and aligned to obtain the multiple text-audio pairs. In this embodiment, the above process is implemented by the following steps of:

acquiring a target text and an audio corresponding to the target text;

preprocessing the audio to obtain a target audio, and converting the target text into a phoneme sequence; and aligning the phoneme sequence with the target audio, and generating the multiple text-audio pairs according to an alignment processing result.

Specifically, the target text includes but is not limited to an article, a sentence, or the like. Correspondingly, the audio specifically refers to a speech generated for the target text. The audio corresponding to the target text may be generated by recording or by speech synthesis, which is not limited in this embodiment. It should be noted that, a matching degree between the audio and the target text is relatively high, so as to ensure that a relatively large amount of the sample data that may be written into the training database can be obtained by the subsequent splicing process. The target audio specifically refers to an audio obtained by standardizing the audio, the phoneme sequence specifically refers to a sequence composed of the smallest unit constituting the target text, and the alignment process specifically refers to a process of determining a time interval corresponding to the text in the audio.

Based on this, in order to ensure that the text segment and the audio segment in the text-audio pair have a high similarity degree, the alignment process is performed from the smallest unit of text when generating the text-audio pair. That is, after acquiring the target text and the audio corresponding to the target text, the audio is firstly preprocessed to obtain the target audio, to remove a part of the audio that may cause interference to the subsequent processing, for example, a blank audio segment (an unvoiced audio segment) at the beginning and/or the end of the audio, or an audio segment (a pronunciation content of which cannot be distinguished) having a relatively large noise at the beginning and/or end of the audio. Next, the target text is converted into a phoneme sequence, to facilitate the alignment of the text with the audio by means of the smallest unit so as to improve the alignment accuracy. Finally, the phoneme sequence is aligned with the target audio, and the multiple text-audio pairs are obtained according to the alignment processing result.

In practical applications, the kaldi alignment tool or the HTK alignment tool may be used in the process of aligning the phoneme sequence with the target audio. In addition, other alignment tools may be selected according to actual needs to complete the alignment of the phoneme sequence with the target audio, which is not limited in this embodiment.

Further, in the process of generating the multiple text-audio pairs according to the alignment processing result, the alignment processing is performed from the smallest unit of the text. In this case, after the alignment processing between the phoneme and the audio is completed, the phonemes is required to be converted into the text to achieve accurate alignment of the text with the audio, and the segmentation process is required to obtain the multiple text-audio pairs meeting the subsequent usage requirement. In this embodiment, the above process is implemented by the following steps of:

acquiring a phoneme audio file according to the alignment processing result, and determining a segmentation position of the phoneme audio file;

segmenting the phoneme audio file according to the segmentation position to obtain multiple phoneme-audio pairs, where each phoneme-audio pair inludes a phoneme segment and an audio segment;

determining, based on the target text, a text segment corresponding to the phoneme segment of each phoneme-audio pair among the multiple phoneme-audio pairs; and generating the multiple text-audio pairs according to the text segment corresponding to the phoneme segment of each phoneme-audio pair and the audio segment of each phoneme-audio pair.

Specifically, the phoneme audio file specifically refers to a file obtained by aligning the phoneme sequence with the target audio, the segmentation position may be a segmentation position in the target audio or a position where a pronunciation interruption time exceeds a set time threshold, and the phoneme-audio pair specifically refers to a queue composed of a phoneme segment and an audio segment having a corresponding relationship.

Based on this, the phoneme audio file is obtained after completing the alignment of the phoneme sequence with the target audio. In order to obtain a large amount of the sample data that may be written into the training database by the subsequent splicing process, the phoneme audio file is segmented according to the segmentation position of the target audio in the phoneme audio file, obtain multiple phoneme-audio pairs. Each phoneme-audio pair includes a phoneme segment and an audio segment corresponding to phoneme segment. The phoneme segment of each phoneme-audio pair is converted into a text segment based on the target text, so that the text-audio pair is formed by the text segment and the audio segment corresponding to the phoneme segment in each phoneme-audio pair, where the text-audio pair includes the text segment and the audio segment corresponding to the text segment. By the multiple formed text-audio pairs, the sample data for writing into the training database can be spliced in subsequent processing, to complete the preparation of the sample data.

In a specific implementation, the target audio has been accurately aligned with the audio sequence. Therefore, after segmenting the phoneme audio file according to the segmentation position of the target audio, the phoneme segment and the audio segment contained in each phoneme-audio pair obtained by the segmenting process correspond to each other. Further, according to a speech feature of a user, the phoneme segment contained in the segmented phoneme-audio pair can ensure that a corresponding text segment is found in the target text, and there is no problem that the phoneme segment is incomplete after the segmenting process.

Figure 2:
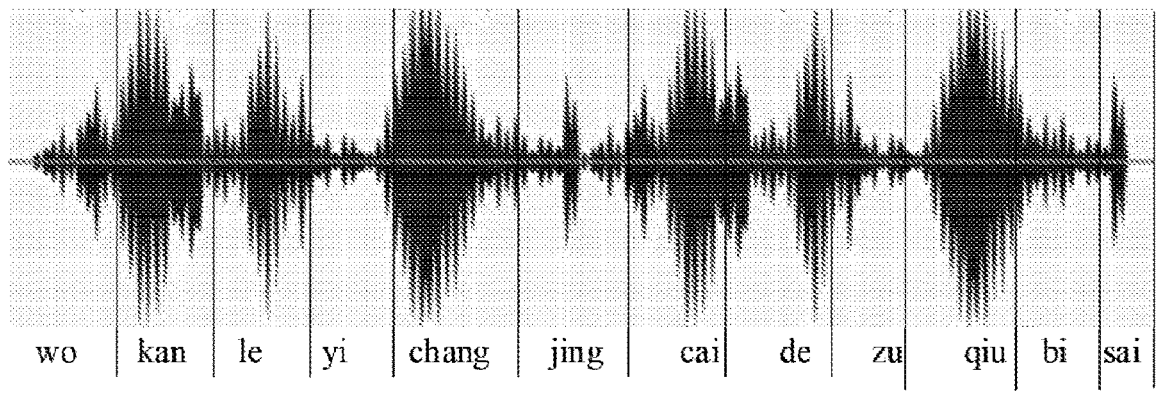
FIG. 2 is a schematic diagram showing an alignment processing result in the sample generation method according to the embodiment of the present disclosure.

For example, a target text is "我看了一场精彩的足球比赛", and an audio having a time length of 12 s is generated for the target text. In order to facilitate the subsequent alignment process, blank audio segments at the beginning and end of the audio are deleted, and thus a target audio having a time length of 10 s is obtained. Further, in order to improve the alignment accuracy, a phoneme sequence (wo kan le yi chang jing cai de zu qiu bi sai) corresponding to the target text "我看了一场精彩的足球比赛" is converted, and the phoneme sequence is aligned with the target audio by the kaldi alignment tool. In this way, the alignment processing result is obtained as shown in FIG. 2, that is, a phoneme audio file composed of the phoneme sequence and the target audio.

Further, by detecting the target audio in the phoneme audio file, it is determined that the user speaking in the target audio breaks the sentence for four times when recording this speech. The sentence is broken for a first time at 3 s of the target audio, and the sentence is broken for a second time at 4 s of the target audio, the sentence is broken for a third time at 6 s of the target audio, and the sentence is broken for a fourth time at 8 s of the target audio. In this case, it is determined that the segmentation positions of the phoneme audio file are respectively $T_1=3$, $T_2=4$, $T_3=6$, and $T_4=8$. The phoneme audio file is segmented according to the segmentation positions to obtain five phoneme-audio pairs. A first phoneme-audio pair $P_1$ is formed by a first phoneme segment (wo kan le) and a first audio segment (0 s~3 s), a second phoneme-audio pair $P_2$ is formed by a second phoneme segment (yi chang) and a second audio segment (3 s~4 s), a third phoneme-audio pair $P_3$ is formed by a third phoneme segment (jing cai de) and a third audio segment (4 s~6 s), a fourth phoneme-audio pair $P_4$ is formed by a fourth phoneme segment (zu qiu) and a fourth audio segment (6 s~8 s), and a fifth phoneme-audio pair $P_5$ is formed by a fifth phoneme segment (bi sai) and a fifth audio segment (8 s~10 s).

Further, after obtaining the phoneme-audio pairs $P_1$ to $P_5$, the phoneme segment in each phoneme-audio pair is required to be converted into a text segment, so as to obtain a text-audio pair that can be used for a subsequent splicing process. The text segment corresponding to the phoneme segment in each phoneme-audio pair may be determined according to the target text "我看了一场精彩的足球比赛". That is, a first text segment corresponding to the first phoneme segment (wo kan le) in the first phoneme-audio pair $P_1$ is determined as (我看了), a second text segment corresponding to the second phoneme segment (yi chang) in the second phoneme-audio pair $P_2$ is determined as (一场), a third text segment corresponding to the third phoneme segment (jing cai de) in the third phoneme-audio pair $P_3$ is determined as (精彩的), a fourth text segment corresponding to the fourth phoneme segment (zu qiu) contained in the fourth phoneme-audio pair $P_4$ is determined as (足球), and a fifth text segment corresponding to the fifth phoneme segment (bi sai) in the fifth phoneme-audio pair $P_5$ is determined as (比赛).

Figure 3:
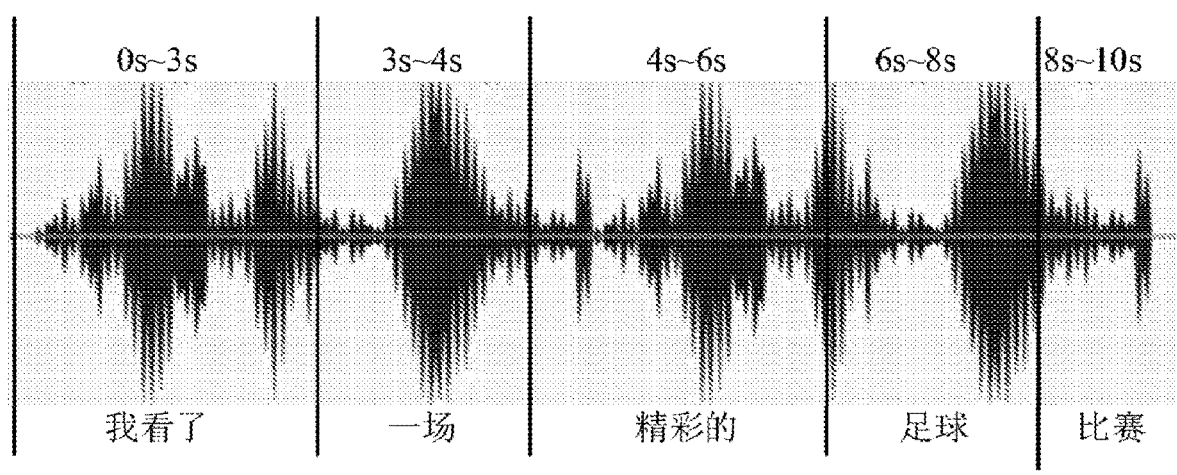
FIG. 3 is a schematic diagram showing a segmentation processing result in the sample generation method according to the embodiment of the present disclosure.

Next, multiple text-audio pairs corresponding to the target text and the target audio are generated according to the obtained text segments and audio segments, as shown in the segmentation result in FIG. 3. A first text-audio pair $TA_1$ is formed by the first text segment (我看了) and the first audio segment (0 s~3 s), a second text-audio pair $TA_2$ is formed by the second text segment (一场) and the second audio segment (3 s~4 s), a third text-audio pair $TA_3$ is formed by the third text segment (精彩的) and the third audio segment (4 s~6 s), a fourth text-audio pair $TA_4$ is formed by the fourth text segment (足球) and the fourth audio segment (6 s~8 s), and a fifth text-audio pair $TA_5$ is formed by the fifth text segment (比赛) and the fifth audio segment (8 s~10 s), so as to subsequently splice the sample data that can be written into the training database, to be used for training the speech synthesis model.

In summary, when constructing the multiple text-audio pairs, the alignment with the target audio is completed from the phoneme as the smallest unit. In this way, not only the accuracy of the text-audio alignment can be improved, but also the matching degree between the phoneme segment and the audio segment obtained by the segmenting process can be guaranteed to be relatively high, so that the multiple text-audio pairs obtained by the segmenting process all can be used for the subsequent sample generation process, providing sufficient quantity guarantee for the subsequent generation of the sample data.

In step S104, for each text-audio pair among the multiple text-audio pairs, an audio feature of the audio segment of the text-audio pair is calculated, and a target text-audio pair and a splicing text-audio pair corresponding to the target text-audio pair are screened out from the multiple text-audio pairs according to the audio feature.

Specifically, the multiple text-audio pairs are acquired. Based on this, since the text-audio pairs written into the training database are used for training the model, the quality of the sample data used for training the model should be ensured in order to improve the prediction accuracy of the trained model. That is, when splicing the text-audio pairs that can be written into the training database, the timbre and the rhythm of the text-audio pair before the splicing should be considered. If the timbre and the rhythm of one text-audio pair are not the same as or similar to those of another text-audio pair before the splicing, or the tone of the one text-audio pair is inconsistent with that of the another text-audio pair, the spliced text-audio pair has the problem of mismatching audio segments and inconsistent context semantics between the text segments, and thus cannot be used for training the model.

Based on this, in order to splice high-quality text-audio pairs (the sample data that can be written into the training database) to train a model with a relatively high prediction accuracy, the audio feature of the audio segment in each text-audio pair is calculated before splicing the text-audio pair in the present disclosure. Next, based on the audio feature, the text-audio pair that can be spliced is selected from the multiple text-audio pairs, to splice text-audio pairs with similar attributes such as the tone and the rhythm, so as to obtain the text-audio pair having consistent audio segments and semantically consistent text segments, thereby obtain the high-quality text-audio pairs, for training the model in the subsequent process.

The audio feature includes but is not limited to a pitch frequency feature, an audio frame feature and/or an audio frame energy feature indicating the audio segment. According to the audio feature of the audio segment in the text-audio pair, whether the text-audio pair required to be spliced is suitable for the splicing process may be determined. That is, according to the pitch frequency feature, the audio frame feature and/or the audio frame energy feature, it is determined whether the tones, the rhythms and other attributes of the text-audio pairs required to be spliced are similar or the same, so as to screen out the splicing text-audio pair from the multiple text-audio pairs according to the audio feature. The target text-audio pair specifically refers to a reference text-audio pair. The splicing text-audio pair refers to a text-audio pair that meets a splicing condition with the reference text-audio pair.

Based on this, after acquiring the multiple text-audio pairs, in order to obtain text-audio pairs that can be spliced with each other (that is, the timbres and the rhythms of the text-audio pairs are similar or the same) to generate more sample data, the audio feature of the audio segment in each text-audio pair is calculated. Further, after determining the target text-audio pair, the splicing text-audio pair corresponding to the target text-audio pair is screened out from the multiple text-audio pairs based on the audio feature of the audio segment of the target text-audio pair and the audio features of the audio segments of the multiple text-audio pairs, for subsequent generation of the sample data. In this way, in the process of splicing a large amount of sample data, not only the number of sample data is met, but also the similarity between the text-audio pairs before the splicing process can be ensured in combination with the audio feature, thereby improving the quality of the text-audio pair obtained by the splicing process.

Further, in the process of calculating the audio feature of the audio segment of each text-audio pair, in order to fully reflect an attribute feature of the audio segment in each text-audio pair by means of the audio feature, a framing process may be performed on the audio segment of each text-audio pair, and the audio feature is analyzed based on audio frames. In this embodiment, the above process is implemented by the following steps of:

for each text-audio pair among the multiple text-audio pairs,
extracting the audio segment of the text-audio pair, and performing a framing process on the audio segment of the text-audio pair, to obtain an audio frame set of the text-audio pair;

calculating, based on audio frames in the audio frame set of the text-audio pair, a pitch frequency feature and an audio frame feature of the audio segment of the text-audio pair; and determining the audio feature of the audio segment of the text-audio pair according to the pitch frequency feature and the audio frame feature of the audio segment of the text-audio pair.

Specifically, the pitch frequency feature specifically refers to a frequency value corresponding to the vibration with the lowest frequency among a series of vibrations having different frequencies and amplitudes made by a sounding body in the audio segment. The audio frame feature specifically refers to a frame energy value obtained by performing calculation on points on a spectrum of the audio frames in the audio segment after the Fourier transformation process. Correspondingly, the pitch frequency feature may be used to analyze whether pronunciation vibration amplitudes of the text-audio pairs when being spliced are similar or the same. The audio frame feature may be used to analyze whether energy distributions of the text-audio pairs when being spliced are similar or the same. In this way, the text-audio pairs with a better splicing effect can be selected for the splicing process according to the pitch frequency and the frame energy, to obtain the sample data that meets the usage requirement.

Based on this, the audio segment of each text-audio pair is firstly extracted, and the framing process is performed on the audio segment of the text-audio pair to obtain the audio frame set of the text-audio pair. Next, based on the audio frames in the audio frame set, the pitch frequency feature and the audio frame feature of the audio segment of the text-audio pair are calculated. Next, the audio feature of the audio segment of each text-audio pair is determined according to the pitch frequency feature and the audio frame feature of the audio segment of the text-audio pair.

In addition, any two text-audio pairs have the possibility of being spliced. Therefore, in order to obtain more text-audio pairs that can be written into the training database, a start audio feature (a start pitch frequency feature and a start audio frame feature) and an end audio feature (an end pitch frequency feature and an end audio frame feature) of the audio segment of each text-audio pair may be calculated. Further, in the process of calculating the audio feature. Further, in the process of screening the splicing text-audio pair corresponding to the target text-audio pair from the multiple text-audio pairs, the target text-audio pair may be used as a start text-audio pair, and based on the end audio feature of the audio segment in the target text-audio pair and the start audio feature of the audio segment of each text-audio pair, the splicing text-audio pair is screened out by the calculation. Next, in the process of splicing the target text-audio pair and the splicing-text-audio pair, the target text-audio pair may be used as the start text-audio pair, the splicing text-audio pair may be used as the end text-audio pair, and the target text-audio pair and the splicing text-audio pair are spliced in order, to obtain a to-be-detected text-audio pair that required to be detected subsequently.

Alternatively, the target text-audio pair may be used as the end text-audio pair, and based on the start audio feature of the audio segment in the target text-audio pair and the end audio feature of the audio segment of each text-audio pair, the splicing text-audio pair is screened out by the calculation. Next, in the process of splicing the target text-audio pair and the splicing text-audio pair, the target text-audio pair may be used as the end text-audio pair, and the splicing text-audio pair may be used as the start text-audio pair, and the target text-audio pair and the splicing text-audio pair are spliced in order, to obtain a to-be-detected text-audio pair that required to be detected subsequently. In this process, the target text-audio pair has been spliced with other text-audio pairs with the target text-audio pair being as the start text-audio pair or the end text-audio pair. In this case, in the process of splicing other text-audio pairs, the process of splicing with the target text-audio pair can be omitted, so as to improve the processing efficiency in the subsequent splicing process.

In a specific implementation, the process of calculating the pitch frequency feature may be achieved by a time domain estimation method. That is, the pitch frequency is estimated directly from the audio waveform, for example, by an autocorrelation method, a parallel processing method, an average amplitude difference method or a data reduction method. Further, the process of calculating the pitch frequency feature may be achieved by a transforming method. That is, the pitch frequency is estimated by transforming the audio speech signal into the frequency domain or the time domain. In this process, the influence of the channel is firstly eliminated by a homomorphic analysis method to obtain information for the excitation, and the pitch frequency is calculated, for example, by a cepstrum method. Further, the process of calculating the pitch frequency feature may be achieved by a hybrid method. That is, a signal channel model parameter is firstly extracted, and the signal filtering is performed based on the signal channel model parameter to obtain a sound source sequence. Next, the pitch frequency is calculated by the autocorrelation method or the average amplitude difference method. In summary, the process of calculating the pitch frequency feature of the audio segment may be achieved by an appropriate method according to an actual application scenario, which is not limited in this embodiment.

The process of calculating the audio frame feature may be achieved by the following processes. The Fourier transform is performed on each frame of audio to obtain the spectrum corresponding to the audio segment, and values of points in the spectrum are determined. A sum of squares of the values is calculated to obtain the energy of each audio frame, and the audio frame feature may be obtained by averaging energies of the audio frames. Alternatively, lengths of the audio frames in the complex field are added to obtain the frame energy corresponding to each frame of audio, and the audio frame feature may be obtained by averaging the frame energies of the audio frames. In summary, the process of calculating the audio frame feature of the audio segment may be achieved by an appropriate method according to an actual application scenario, which is not limited in this embodiment.

In addition, when performing the framing process on the audio segment of each text-audio pair, the framing process may be performed at a fixed frame length, for example, 32 ms or 64 ms, which may be set according to an actual need and is not limited in this embodiment.

The following description is given still following the above example. After obtaining the text-audio pairs $TA_1$ to $TA_5$, the start pitch frequency and the start frame energy of the audio segment in each text-audio pair may be calculated in advance, as well as the end pitch frequency and the end frame energy of the audio segment in each text-audio pair, so as to splice a large amount of sample data that meets the quality requirement. Based on this, the audio segment of each text-audio pair are firstly extracted, and the framing process is performed on the audio segment of the text-audio pair to obtain five audio frame sets, which respectively correspond to the text-audio pairs $TA_1$ to $TA_5$. Next, with the transformation method and the five audio frame sets, the start pitch frequency $F0_{s1}$ of the first audio segment is calculated as $F0_{s1}=N_{s1}$, and the end pitch frequency $F0_{s1}$ of the first audio segment is calculated as $F0_{e1}=N_{e1}$. Further, the start pitch frequency $F0_{s2}$ of the second audio segment is calculated as $F0_{s2}=N_{s2}$, and the end pitch frequency $F0_{e2}$ of the second audio segment is calculated as $F0_{e2}=N_{e2}$. The start pitch frequency $F0_{s3}$ of the third audio segment is calculated as $F0_{s3}=N_{s3}$, and the end pitch frequency $F0_{e3}$ of the third audio segment is calculated as $F0_{e3}=N_{e3}$. The start pitch frequency $F0_{s4}$ of the fourth audio segment is calculated as $F0_{s4}=N_{s4}$, and the end pitch frequency $F0_{e4}$ of the fourth audio segment is calculated as $F0_{e4}=N_{e4}$. The start pitch frequency $F0_{s5}$ of the fifth audio segment is calculated as $F0_{s5}=N_{s5}$, and the end pitch frequency $F0_{e5}$ of the fifth audio segment is calculated as $F0_{e5}=N_{e5}$. In addition, with the method of calculating the sum of squares of the values of the statistical points on the spectrum obtained after the Fourier transform and the five audio frame sets, the start frame energy Est of the first audio segment is calculates as $Es1=M_{s1}$, and the end frame energy Eel of the first audio segment is calculates as $E_{e1}=M_{e1}$. Further, the start frame energy $E_{s2}$ of the second audio segment is calculates as $E_{s2}=M_{s2}$, and the end frame energy $E_{e2}$ of the second audio segment is calculates as $E_{e2}=M_{e2}$. The start frame energy $E_{s3}$ of the third audio segment is calculated as $E_{s3}=M_{s3}$, and the end frame energy $E_{e3}$ of the third audio segment is calculates as $E_{e3}=M_{e3}$. The start frame energy $E_{s4}$ of the fourth audio segment is calculates as $E_{s4}=M_{s4}$, and the end frame energy $E_{e4}$ of the fourth audio segment is calculates as $E_{e4}=M_{e4}$. The start frame energy $E_{e5}$ of the fifth audio segment is calculated as $E_{s5}=M_{s5}$, and the end frame energy $E_{e5}$ of the fifth audio segment is calculated as $E_{e5}=M_{e5}$.

Further, according to the start/end pitch frequency and the start/end frame energy of each audio segment, the audio feature of the audio segment is determined. Specifically, the initial audio feature of the first audio segment is determined as $(F0_{s1}=N_{s1}, E_{s1}=M_{s1})$, and the end audio feature of the first audio segment is determined as $(F0_{e1}=N_{e1}, E_{e1}=M_{e1})$. Further, the start audio feature of the second audio segment is determined as $(F0_{s2}=N_{s2}, E_{s2}=M_{s2})$, and the end audio feature of the second audio segment is determined as $(F0_{e2}=N_{e2}, E_{e2}=M_{e2})$. The start audio feature of the third audio segment is determined as $(F0_{s3}=N_{s3}, E_{s3}=M_{s3})$, the end audio feature of the third audio segment is determined as $(F0_{e3}=N_{e3}, E_{e3}=M_{e3})$. The start audio feature of the fourth audio segment is determined as $(F0_{s4}=N_{s4}, E_{s4}=M_{s4})$, and the end audio feature of the fourth audio segment is determined as $(F0_{e4}=N_{e4}, E_{e4}=M_{e4})$. The start audio feature of the fifth audio segment is determined as $(F0_{s5}=N_{s5}, E_{s5}=M_{s5})$, the end audio feature of the fifth audio segment is determined as $(F0_{e5}=N_{e5}, E_{e5}=M_{e5})$. In the subsequent process of screening the splicing text-audio pair, the text-audio pairs having a higher splicing effect may be screened out for the splicing process according to the audio feature.

In addition, when calculating the audio feature of the audio segment of each text-audio pair, the efficient calculation may be achieved in the way of forward connection and backward connection so as to improve the calculation efficiency. That is, if it is determined that the audio feature of an audio segment is require to be calculated, audio segments connected in front of the audio segment and audio segments connected behind the audio segment may be selected to form adjacent audio segments. The audio features of the audio segment and two audio segments among the adjacent audio segments are all calculated, to save the time consumed by calculating the audio features and improve the update efficiency of the trained database.

In summary, in order to splice the high-quality sample data, the audio features of the audio segments respectively in the text-audio pairs are calculated in advance, so that the attribute information of the audio segment in each text-audio pair is analyzed in the terms of attribute. In this way, when screening the splicing text-audio pair corresponding to the target text-audio pair, a text-audio pair with a better splicing effect can be selected as the splicing text-audio pair according to the audio feature, so as to improve the quality of the sample data.

Figure 4:
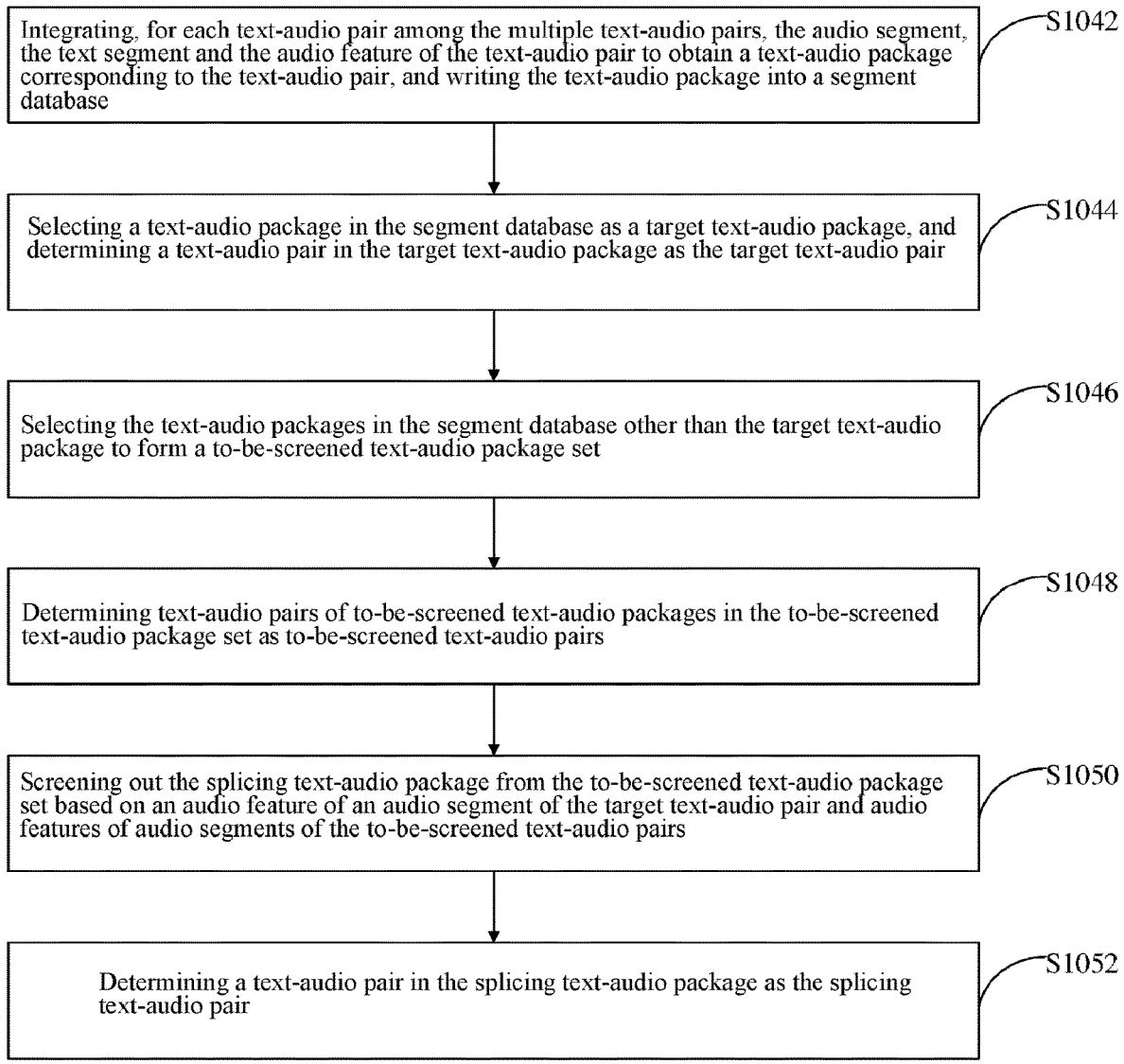
FIG. 4 is a flowchart showing a process of screening a splicing text-audio pair in the sample generation method according to the embodiment of present disclosure.

Further, after calculating the audio feature of the audio segment of the text-audio pair, the target text-audio pair and the splicing text-audio pair are screened out from the text-audio pairs according to the audio feature, for the subsequent splicing process, so as to obtain the sample data that meets the writing requirement. In this embodiment, the above process may be implemented by the following steps S1042 to S1052 as shown in FIG. 4.

In step S1042, for each text-audio pair among the multiple text-audio pairs, the audio segment, the text segment and the audio feature of the text-audio pair are integrated to obtain a text-audio package corresponding to the text-audio pair, and the text-audio package is written into a segment database.

In step S1044, a text-audio package in the segment database is selected as a target text-audio package, and a text-audio pair in the target text-audio package is determined as the target text-audio pair.

In step S1046, the text-audio packages in the segment database other than the target text-audio package are selected to form a to-be-screened text-audio package set.

In step S1048, text-audio pairs of to-be-screened text-audio packages in the to-be-screened text-audio package set are determined as to-be-screened text-audio pairs.

In step S1050, based on an audio feature of an audio segment of the target text-audio pair and audio features of audio segments of the to-be-screened text-audio pairs, the splicing text-audio package is screened out from the to-be-screened text-audio package set.

In step S1052, a text-audio pair in the splicing text-audio package is determined as the splicing text-audio pair.

Specifically, the text-audio package specifically refers to a set composed of text-audio pairs written into the segment database and corresponding text features, and the segment database specifically refers to a database for temporarily storing the text segments, the audio segments of the text-audio pairs and corresponding audio features. After obtaining the multiple text-audio pairs, the process of screening an associated splicing text-audio pair for the target text-audio pair may take a certain amount of time. In this case, the text-audio package may be firstly written into the segment database. In a case that the splicing process is required, the text-audio pairs may be extracted from the segment database for the subsequent splicing process.

Further, the to-be-screened text-audio packages in the to-be-screened text-audio package set specifically refer to text-audio packages in the segment database other than the target text-audio package. Correspondingly, the to-be-screened text-audio pairs refer to text-audio pairs of the to-be-screened text-audio packages. The splicing text-audio package specifically refers to a text-audio package to which the text-audio pair that can be spliced with the target text-audio package belongs.

Based on this, the audio segment, the text segment and the audio feature are firstly integrated for each text-audio pair among the multiple text-audio pairs, to obtain multiple text-audio packages, and the multiple text-audio packages are temporarily written into the segment database. In the case that the text-audio pairs are required to be spliced, any text-audio package is selected from the segment database as the target text-audio package. Next, the text-audio pair in the target text-audio package is extracted as the target text-audio pair, and the text-audio packages in the segment database other than the target text-audio package are selected as the to-be-screened text-audio packages to form the to-be-screened text-audio package set.

Next, the text-audio pairs of the to-be-screened text-audio packages in the to-be-screened text-audio package set are extracted as the to-be-screened text-audio pairs. For each to-be-screened text-audio pair, the audio feature of the audio segment of the to-be-screened text-audio pair is determined according to the audio features integrated in the to-be-screened text-audio packages.

Next, based on the audio feature of the audio segment of the target text-audio pair and the audio features of the audio segments of the to-be-screened text-audio pairs, a matching degree between the target text-audio pair and each to-be-screened text-audio pair may be calculated. The text-audio package to which the to-be-screened text-audio pair having a high matching degree belongs may be selected as the splicing text-audio package. That is, the text-audio pair in the splicing text-audio package is determined as the splicing text-audio pair corresponding to the target text-audio pair, for the subsequent splicing process to obtain the sample data that meets the requirement of writing to the training database.

Further, in the process of screening the splicing text-audio package based on the audio feature of the audio segment of the target text-audio pair and the audio features of the audio segments of the to-be-screened text-audio pairs, in order to screen out the text-audio pair having a high matching degree with the target text-audio pair, the splicing text-audio package may be obtained in the following manner in this embodiment, so as to determine the text-audio pair in the splicing text-audio package as the splicing text-audio pair for the subsequent splicing process with the target text-audio pair to obtain the sample data that meets the requirement of writing to the training database. The above process is implemented by the following steps of:

determining a first audio feature of the audio segment of the target text-audio pair according to the target text-audio package, and determining, for each of the to-be-screened text-audio pairs, a second audio feature of the audio segment of the to-be-screened text-audio pair according to the to-be-screened text-audio package;

calculating a feature distance between the first audio feature and the second audio feature; and determining a to-be-screened text-audio package to which a to-be-screened text-audio pair whose feature distance is less than a preset distance threshold belongs, as the splicing text-audio package.

Specifically, the first audio feature refers to the audio feature of the audio segment of the target text-audio pair, and the second audio feature refers to the audio feature of the audio segment of the to-be-screened text-audio pair. Correspondingly, the feature distance specifically refers to a numerical value for indicating the matching degree between the text-audio pairs. A large feature distance indicates a low matching degree between the text-audio pairs. Further, a small feature distance indicates a high matching degree between the text-audio pairs.

Based on this, after determining the first audio feature of the audio segment of the target text-audio pair, and the second audio feature of the audio segment of the to-be-screened text-audio pair, the feature distance between the target text-audio pair and the to-be-screened text-audio pair may be calculated according to the first audio feature and the second audio feature. The to-be-screened text-audio pair whose feature distance is less than the preset distance threshold is selected as the splicing text-audio pair, for the subsequent splicing process.

The process of calculating the feature distance may be implemented by the following formula (1).

$$L=(F0_e-F0_s)^2+(E_e-E_s)^2 \qquad (1)$$

where L represents the feature distance, $F0_e$ represents the end pitch frequency feature of the audio segment of the target text-audio pair, $F0_s$ represents the start pitch frequency feature of the audio segment of the to-be-screened text-audio pair, $E_e$ represents the end audio frame feature of the audio segment of the target text-audio pair, and $E_s$ represents the start audio frame feature of the audio segment of the to-be-screened text-audio pair.

The following description is given still following the above example. After obtaining the text-audio pairs $TA_1$ to $TA_5$ and the audio features of the audio segments of the text-audio pairs, the text-audio pair and the corresponding audio feature may be integrated into a text-audio package ($TP_1$ to $TP_5$). The text-audio package is written into the segment database D, so that the text audio package can be selected for the subsequent splicing process in the case that the splicing process is required.

Further, the text-audio package $TP_1$ in the segment database D is selected as the target text-audio package, and the text-audio pair $TA_1$ in the text-audio package $TP_1$ is determined as the target text-audio pair. Further, the text-audio packages $TP_2$, $TP_3$, $TP_4$ and $TP_5$ in the segment database D are selected as the to-be-screened text-audio packages, and the text-audio pairs $TA_2$, $TA_3$, $TA_4$ and $TA_5$ respectively in the to-be-screened text-audio packages are determined as the to-be-screened text-audio pairs. According to the text-audio package $TP_1$, the audio feature of the target text-audio pair $TA_1$ may be determined as $[(F0_{s1}=N_{s1}, E_{s1}=M_{s1}), (F0_{e1}=N_{e1}, E_{e1}=M_{e1})]$. Further, according to the text-audio package $TP_2$, the audio feature of the to-be-screened text-audio pair $TA_2$ may be determined as $[(F0_{s2}=N_{s2}, E_{s2}=M_{s2}), (F0_{e2}=N_{e2}, E_{e2}=M_{e2})]$. Further, according to the text-audio package $TP_3$, the audio feature of the to-be-screened text-audio pair $TA_3$ may be determined as $[(F0_{s3}=N_{s3}, E_{s3}=M_{s3}), (F0_{e3}=N_{e3}, E_{e3}=M_{e3})]$. Further, according to the text-audio package $TP_4$, the audio feature of the to-be-screened text-audio pair $TA_4$ may be determined as $[(F0_{s4}=N_{s4}, E_{s4}=M_{s4}), (F0_{e4}=N_{e4}, E_{e4}=M_{e4})]$. Moreover, according to the text-audio package $TP_5$, the audio feature of the to-be-screened text-audio pair $TA_5$ may be determined as $[(F0_{s5}=N_{s5}, E_{s5}=M_{s5}), (F0_{e5}=N_{e5}, E_{e5}=M_{e5})]$.

Further, the feature distance between the target text-audio pair and each to-be-screened text-audio pair is calculated according to the formula (1). The feature distance between the target text-audio pair $TA_1$ and the to-be-screened text-audio pair $TA_2$ is determined as $L_1=(F0_{e1}-F0_{s2})^2+(E_{e1}-E_{s2})^2=(N_{e1}-N_{s2})^2+(M_{e1}-M_{s2})^2$. The feature distance between the target text-audio pair $TA_1$ and the to-be-screened text-audio pair $TA_3$ is determined as $L_2=(F0_{e1}-F0_{s3})^2+(E_{e1}-E_{s3})^2=(N_{e1}-N_{s3})^2+(M_{e1}-M_{s3})^2$. The feature distance between the target text-audio pair $TA_1$ and the to-be-screened text-audio pair $TA_4$ is determined as $L_3=$ $(F0_{e1}-F0_{s4})^2+(E_{e1}-E_{s4})^2=(N_{e1}-N_{s4})^2+(M_{e1}-M_{s4})^2$. The feature distance between the target text-audio pair $TA_1$ and the to-be-screened text-audio pair $TA_5$ is determined as $L_4=(F0_{e1}-F0_{s5})^2+(E_{e1}-E_{s5})^2=(N_{e1}-N_{s5})^2+(M_{e1}-M_{s5})^2$.

A small feature distance indicates a high matching degree between the target text-audio pair and the to-be-screened text-audio pair. In this case, when comparing feature distances $L_1$ to $L_4$ respectively with a preset distance threshold LT, the to-be-screened text-audio pair whose feature distance is less than the distance threshold LT is selected as the splicing text-audio pair that can be spliced with the target text-audio pair $TA_1$. Based on the comparison result, it is determined that the feature distances $L_1$, $L_3$ and $L_4$ are all less than the distance threshold LT, which further indicates that, the timbre and the rhythm can be ensured to be relatively close when splicing the target text-audio pair $TA_1$ with the to-be-screened text-audio pairs $TA_2$, $TA_4$ and $TA_5$, so as to subsequently splice the high-quality sample data. That is, it is determined that the to-be-screened text-audio pairs $TA_2$, $TA_4$ and $TA_5$ can be spliced with the target text-audio pair $TA_1$. In other words, the text-audio pairs $TA_2$, $TA_4$ and $TA_5$ are determined as splicing text-audio pairs for the target text-audio pair $TA_1$.

In addition, in order to improve the calculation efficiency of subsequently calculating the feature distance in the case of another text-audio pair as the target text-audio pair, the target text-audio pair may be determined as a backward text-audio pair, the to-be-screened text-audio pair may be determined as a forward text-audio pair, and the feature distance between each other is calculated. For example, in the process of calculating the feature distance $L_1$ between the target text-audio pair $TA_1$ and the to-be-screened text-audio pair $TA_2$, a feature distance $L_{11}$ between the target text-audio pair $TA_1$ and the to-be-screened text-audio pair $TA_2$ may be calculated, where $L_{11}=(F0_{e2}-F0_{s1})^2\pm(E_{e2}-E_{s1})^2=(N_{e2}-N_{s1})^2+(M_{e2}-M_{s1})^2$. The feature distance $L_{11}$ indicates the matching degree between the target text-audio pair $TA_1$ and the to-be-screened text-audio pair $TA_2$ in the case of the to-be-screened text-audio pair $TA_2$ being as the forward text-audio pair and the target text-audio pair $TA_1$ being as the backward text-audio pair after the splicing In this way, in the process of calculating the feature distance between the target text-audio pair and each to-be-screened text-audio pair, the feature distance in the case of the target text-audio pair being as the forward text-audio pair and the feature distance in the case of the target text-audio pair being the backward text-audio pair are calculated, which saves the process of calculating the feature distance between the text-audio pair $TA_1$ and the text-audio pair $TA_2$ in the case of the to-be-screened text-audio pair $TA_2$ being as the target text-audio pair, thereby improving the efficiency of subsequently calculating the feature distance.

In summary, in order to screen out the splicing text-audio pair corresponding to the target text-audio pair from the multiple text-audio pairs, the splicing text-audio pair is screened in combination with the audio feature, so that the screened text-audio pair has a close attribute with the target text-audio pair in terms of the timbre and the rhythm, and thus a to-be-detected text-audio pair that meets the usage requirement can be subsequently spliced, thereby expanding the training database for use by the downstream business.

In step S106, the target text-audio pair and the splicing text-audio pair are spliced into a to-be-detected text-audio pair, and the to-be-detected text-audio pair is detected.

Specifically, the splicing text-audio pair corresponding to the target text-audio pair is acquired based on the audio feature. Based on this, the target text-audio pair and the splicing text-audio pair are spliced to obtain the to-be-detected text-audio pair. Further, the to-be-detected text-audio pair is spliced from two text-audio pairs. In this case, in order to further ensure the quality of the text-audio pair written in the training database (the to-be-detected text-audio pair has a good splicing effect), the to-be-detected text-audio pair may be detected before being written to the training database, to determine whether the audio segment of the to-be-detected text-audio pair is clear, whether the length of the text segment is appropriate, and the like, so as to obtain the text-audio pair with better quality to be written into the training database.

In addition, the target text-audio pair may meet the requirement of writing into the training database, that is, the target text-audio pair may be directly written into the training database without being spliced with other text-audio pairs. In this case, in order to improve the richness of the training database and avoid omission of the sample data that can be written into the training database, whether the target text-audio pair meets the preset detection condition may be determined before performing the splicing process. In this embodiment, the above process may be implemented by the following steps of:

sampling the audio segment of the target text-audio pair to obtain target sampling information, and determining target text information of the text segment of the target text-audio pair; and determining whether the target sampling information and the target text information meet the preset detection condition, where in a case that the target sampling information and the target text information do not meet the preset detection condition, the step of splicing the target text-audio pair and the splicing text-audio pair into the to-be-detected text-audio pair and detecting the to-be-detected text-audio pair is performed; and in a case that the target sampling information and the target text information meets the preset detection condition, the target text-audio pair is written into the training database.

Specifically, the target sampling information specifically refers to the number of sampling bits and the sampling frequency used for randomly sampling the audio segment of the target text-audio pair. The number of sampling bits may be understood as a resolution processing the audio segment. A large number of sampling bits indicates a high resolution, and thus indicates that the authenticity of the audio segment is high. Further, a small number of sampling bits indicates a low resolution, and thus indicates that the authenticity of the audio segment is low. The sampling frequency refers to the number of times sampling the audio segment per second. A high sampling frequency indicates that the audio segment is restored really and naturally. Further, a lower sampling frequency indicates that the audio segment is restored not really and naturally. The target text information specifically refers to information such as length information and character number information of the text segment of the target text-audio pair. Correspondingly, the preset detection condition specifically refers to detection of whether the audio segment and the text segment meet a condition of writing into the training database. In the case that both the audio segment and the text segment of the text-audio pair meet the preset detection condition, the text-audio pair is written into the training database. Alternatively, in a case that the audio segment or the text segment of the text-audio pair meets the preset detection condition, the text-audio pair is written into the training database.

Based on this, after obtaining the target text-audio pair and the corresponding splicing text-audio pair, a random sampling process is performed on the audio segment of the target text-audio pair in a range of [0, 1], obtain the target sampling information. Further, the target text information of the text segment of the target text-audio pair is determined. Whether the target sampling information and the target text information meet the preset detection condition is determined. If the target sampling information and the target text information meet the preset detection condition, which indicates that the target text-audio pair has met the requirement of writing into the training database, the target text-audio pair may be directly written into the training database as the sample data for the downstream business. If the target sampling information and the target text information do not meet the preset detection condition, which indicates that the target text-audio pair has not met the requirement of writing into the training database, step S106 may be performed, and the to-be-detected text-audio pair obtained by the splicing process is detected, so as to balance the audio segments and the text segments of the text-audio pairs written in the training database, thereby ensuring that the text segments and the audio segments of the text-audio pairs in the training database are similar or identical in terms of form (the audio length, the text length, the audio energy, or the like), to facilitate the use by the downstream business.

The following description is given still following the above example. After selecting the text-audio pair $TA_1$ from the text-audio pairs $TA_1$ to $TA_5$ as the target text-audio pair, the random sampling process is performed on the first audio segment (0 s~3 s) of the text-audio pair $TA_1$ in the range of [0, 1], to obtain the target sampling information U of the first audio segment. Further, the length of the first text segment (我看了) of the text-audio pair $TA_1$ is determined as having X characters. In this case, it is determined whether the target sampling information U of the first audio segment is greater than a preset sampling result Ut and whether the length X of the first text segment is less than a preset text length Xt. If the target sampling information U of the first audio segment is greater than a preset sampling result Ut and the length X of the first text segment is less than a preset text length Xt, which indicates that both the first audio segment and the first text segment of the text-audio pair $TA_1$ meet the requirement of writing into a training database T, the text-audio pair $TA_1$ may be written into the training database T, as the sample data for training the speech synthesis model in the downstream business. If the target sampling information U of the first audio segment is not greater than a preset sampling result Ut or the length X of the first text segment is not less than a preset text length Xt, which indicates that the first audio segment or the first text segment of the text-audio pair $TA_1$ dos not meet the requirement of writing into the training database T, the splicing text-audio pairs $TA_2$, $TA_4$ and $TA_5$ may be spliced with the text-audio pair $TA_1$, to obtain multiple to-be-detected text-audio pairs. The to-be-detected text-audio pairs are detected, to obtain the text-audio pair that meets the requirement of writing into the training database T.

In summary, before splicing the splicing text-audio pair and the target text-audio pair, the target text-audio pair may be detected, so as to avoid the omission of the text-audio pair that meets the requirement of writing into the training database, thereby improving the richness of the training database.

Further, in the process of splicing the target text-audio pair and the splicing text-audio pair, since each text-audio pair includes a text segment and an audio segment, the audio segments are required to be spliced while splicing the text segments to generate the to-be-detected text-audio pair. In this embodiment, the above process may be implemented by the following steps of:

extracting a target text segment and a target audio segment of the target text-audio pair, and extracting a splicing text segment and a splicing audio segment of the splicing text-audio pair;

splicing the target text segment and the splicing text segment into a to-be-detected text segment, and splicing the target audio segment and the splicing audio segment into a to-be-detected audio segment; and forming the to-be-detected text-audio pair based on the to-be-detected text segment and the to-be-detected audio segment.

Specifically, the target text segment and the target audio segment of the target text-audio pair are extracted, and the splicing text segment and the splicing audio segment of the splicinf text-audio pair are extracted. Next, the target text segment and the splicing text segment are spliced into the to-be-detected text segment, and the target audio segment and the splicing audio segment are spliced into the to-be-detected audio segment. Next, based on the to-be-detected text segment and the to-be-detected audio segment, the to-be-detected text-audio pair is formed.

Further, in the process of detecting the to-be-detected text-audio pair, in order to ensure the quality of the to-be-detected text-audio pair, not only the to-be-detected text segment of the to-be-detected text-audio pair may be detected, but also the to-be-detected audio segment of the to-be-detected text-audio pair may be detected, so as to ensure that both the text segment and the audio segment of the text-audio pair written into the training database meet the writing requirement. In this embodiment, he above process may be implemented by the following steps of:

sampling the to-be-detected audio segment to obtain to-be-detected sampling information, and determining to-be-detected text information of the to-be-detected text segment;

detecting the to-be-detected sampling information and the to-be-detected text information based on the preset detection condition; and writing the to-be-detected text-audio pair into the training database in a case that both the to-be-detected sampling information and the to-be-detected text information meet the preset detection condition.

Specifically, after splicing the to-be-detected text-audio pair, a random sampling process is performed on the to-be-detected audio segment of the to-be-detected text-audio pair to obtain the to-be-detected sampling information of the to-be-detected audio segment. Further, the to-be-detected text information of the to-be-detected text segment of the to-be-detected text-audio pair is determined. Next, based on the preset detection condition, the to-be-detected sampling information and the to-be-detected text information are detected. If both the to-be-detected sampling information and the to-be-detected text information meet the preset detection condition, which indicates that the to-be-detected text-audio pair can be written into the training database, the to-be-detected text-audio pair is written into the training database as the sample data. If the to-be-detected sampling information or the to-be-detected text information does not meet the preset detection condition, which indicates that the to-be-detected text-audio pair cannot be written into the training database, the to-be-detected text-audio pair is discarded.

The following description is given still following the above example. After determining the target text-audio pair $TA_1$ and the splicing text-audio pairs $TA_2$, $TA_4$ and $TA_5$, the splicing process is performed on the target text-audio pair and the splicing text-audio pair. That is, the first audio segment (0 s~3 s) and the first text segment (我看了) of the target text-audio pair $TA_1$ are extracted, the second audio segment (3 s~4 s) and the second text segment (一场) of the splicing text-audio pair $TA_2$. are extracted, the fourth audio segment (6 s~8 s) and the fourth text segment (足球) of the splicing text-audio pair $TA_4$ are extracted, and the fifth audio segment (8 s~10 s) and the fifth text segment (比赛) of the splicing text-audio pair $TA_5$ are extracted.

Further, the first audio segment and the second audio segment are spliced to obtain a first to-be-detected audio segment (having a length of 4 s). The first audio segment and the fourth audio segment are spliced to obtain a second to-be-detected audio segment (having a length of 5 s). The first audio segment and the fifth audio segment are spliced to obtain a third to-be-detected audio segment (having a length of 5 s). In addition, the first text segment and the second text segment are spliced to obtain a first to-be-detected audio segment (我看了一场). The first text segment and the fourth text segment are spliced to obtain a second to-be-detected text segment (我看了足球). The first text segment and the fifth text segment are spliced to obtain a third to-be-detected text segment (我看了比赛). The first to-be-detected audio segment and the first to-be-detected text segment are combined into a first to-be-detected text-audio pair, the second to-be-detected audio segment and the second to-be-detected text segment are combined into a second to-be-detected text-audio pair, and the third to-be-detected audio segment and the third to-be-detected text segment are combined into a third to-be-detected text-to-audio pair.

Further, after obtaining the first to-be-detected text-audio pair, the second to-be-detected text-audio pair, and the third to-be-detected text-audio pair, the three to-be-detected text-audio pairs are further detected, to select the text-audio pair that can be written in the training database as the sample data. Based on this, a random sampling process is performed on the to-be-detected audio segment of each to-be-detected text-audio pair in a range of [0, 1]. The sampling result for the first to-be-detected audio segment of the first to-be-detected text-audio pair is determined as $U_1$, the sampling result for the second to-be-detected audio segment of the second to-be-detected text-audio pair is determined as $U_2$, and the sampling result for the third to-be-detected audio segment of the third to-be-detected text-audio pair is determined as $U_3$. Further, the text length of the first to-be-detected text segment of the first to-be-detected text-audio pair is determined as $X_1$, the text length of the second to-be-detected text segment of the second to-be-detected text-audio pair is determined as $X_2$, and the text length of the third to-be-detected text segment of the third to-be-detected text-audio pair is determined as $X_3$.

Next, it is determined whether the sampling results $U_1$, $U_2$ and $U_3$ are each greater than the preset sampling result Ut, and whether the text lengths $X_1$, $X_2$ and $X_3$ are each less than the preset text length Xt. It is determined based on the determination result that, the sampling result $U_2$ is greater than the preset sampling result Ut and the text length $X_2$ is less than the preset text length Xt, and the sampling result $U_3$ is greater than the preset sampling result Ut and the text length $X_3$ is less than the preset text length Xt. That is, the second to-be-detected text-audio pair and the third to-be-detected text-audio pair meet the requirement of writing the training database T. In this case, the second to-be-detected text-audio pair (having the audio of 5 s and the text of "我看了足球") and the third to-be-detected text-audio pair (having the audio of 5 s and the text of "我看了比赛") are written into the training database T, as the sample data for use in the subsequent training of the speech synthesis model.

In summary, the to-be-detected text-audio pair is detected in the terms of the audio and the text, so that the text-audio pairs written in the training database all meet the writing requirement, effectively improving the quality of the sample data in the training database.

In step S108, in a case that the to-be-detected text-audio pair meets a preset detection condition, the to-be-detected text-audio pair is written into a training database.

Specifically, in the case that the to-be-detected text-audio pair meets the preset detection condition, which indicates that the to-be-detected text-audio pair meets the requirement of writing into the training database, the to-be-detected text-audio pair is written into the training database as the sample data. In this way, in the process of training the speech synthesis model, the sample data that meets the training requirement may be extracted from the training database, so as to improve the prediction accuracy of the trained speech synthesis model.

Based on this, by performing the above processing on each of the multiple texts, a large amount of sample data that meets the requirement of writing in the training database can be obtained, and the sample data written in the training database can meet the requirement of training the model in the downstream in the terms of both the quantity and the quality. Therefore, before training the speech synthesis model, the cost of the data preparation stage can be saved, and the richness of the sample data can be improved.

In addition, in the process of writing the sample data to the training database, the number of pieces of the data written to the training database may be defined considering the capacity of the database and the requirement of the downstream business. That is, in the process of writing the to-be-detected text-audio pair meeting the preset detection condition in the training database, it is determined whether the number of text-audio pairs in the training database is less than or equal to a preset data volume threshold. If the number of the text-audio pairs in the training database is less than the preset data volume threshold, which indicates that an additional text-audio pair can be written into the training database, the text-audio pair meeting the preset detection condition is written into the training database. If the number of the text-audio pairs in the training database is greater than the preset data volume threshold, which indicates that no text-audio pair can be written into the training database, the subsequent processing of splicing the text-audio pairs is stopped.

Further, in the case that the additional text-audio pair can be written into the training database, it may be determined whether the text-audio pair has existed in the training database before being written to the training database, to avoid the occupation of too many storage resources due to the repeated storage. If the text-audio pair has existed in the training database, the text-audio pair is discarded, and the splicing processing of other text-audio pairs continues. If the text-audio pair has not existed in the training database, the text-audio pair is written to the training database, and the splicing processing of other text-audio pairs continues.

Further, after completing the expansion of the training database, the text-audio pairs in the training database may be used as the sample data (sample text-audio pairs) to train the speech synthesis model in the downstream business. In this embodiment, the process of training the model may be implemented by the following steps of:

extracting a sample text-audio pair from the training database, where the sample text-audio pair includes a sample text segment and a sample audio segment; and training a speech synthesis model based on the sample text segment and the sample audio segment, to obtain a target speech synthesis model.

In practical applications, in the process of training the speech synthesis model, a large number of sample text-audio pairs may be extracted from the training database, and the speech synthesis model is trained based on the sample text segments and the sample audio segments of the sample text-audio pairs, until a speech synthesis model that meets the training stop condition is obtained. The speech synthesis model that meets the training stop condition is stored as the target speech synthesis model, so that the text can be converted into the audio in the speech synthesis scenario. For example, if the text is "我喜欢看足球比赛", the text is inputted into the speech synthesis model for processing to obtain an audio corresponding to the text, achieving the processing of converting the text into the speech.

In addition, the case that the to be detected text-audio pair obtained by the splicing process does not meet the preset detection condition may exist, which indicates that the to-be-detected audio segment or the to-be-detected text segment of the to-be-detected text-audio pair may not meet the preset detection condition. In this case, in order to obtain the sample data that meets the condition, a multi-degree splicing text-audio pair corresponding to the splicing text-audio pair may be screened out from the multiple text-audio pairs according to the audio feature, and the splicing and detection process is performed until the text-audio pair that meets the requirement of writing into the training database is obtained. It should be noted that, the to-be-detected text-audio pair obtained by the splicing and detection process may not still meet the requirement of writing into the training database. In this case, a stop condition may be set for the splicing and detection process. When the number of splicing times reaches a certain condition, the processing for the text-audio pair may be stopped and may be discarded. In this embodiment, the above process may be implemented by the following steps of:

screening out a multi-degree splicing text-audio pair corresponding to the splicing text-audio pair from the multiple text-audio pairs according to the audio feature in a case that the to-be-detected text-audio pair does not meet the preset detection condition; and splicing the multi-degree splicing text-audio pair and the to-be-detected text-audio pair into a multi-degree to-be-detected text-audio pair, and determining whether the multi-degree to-be-detected text-audio pair meets the preset detection condition; where in a case that the multi-degree to-be-detected text-audio pair meets the preset detection condition, the multi-degree to-be-detected text-audio pair is written into the training database; and in a case that the multi-degree to-be-detected text-audio pair does not meet the preset detection condition, the multi-degree splicing text-audio pair is determined as the splicing text-audio pair, the multi-degree to-be-detected text-audio pair is determined as the to-be-detected text-audio pair, and the step of screening out the multi-degree splicing text-audio pair corresponding to the splicing text-audio pair from the mulitple text-audio pairs according to the audio feature is performed.

Specifically, the multi-degree splicing text-audio pair refers to a text-audio pair that can be spliced with the splicing text-audio pair. Based on this, the case that the to-be-detected text-audio pair does not meet the preset detection condition may exist, which indicates that the to-be-detected text-audio pair obtained by splicing the target text-audio pair and the splicing text-audio pair do not meet the requirement of writing in the training database. In this case, in order to obtain the text-audio pair that meets the writing requirement, the multi-degree splicing text-audio pair that can be spliced with the splicing text-audio pair may be selected from the multiple text-audio pairs, and the to-be-detected text-audio pair and the multi-degree splicing text-audio pair are spliced to obtain the multi-degree to-be-detected text-audio pair. Next, the multi-degree to-be-detected text-audio pair is detected. If the multi-degree to-be-detected text-audio pair meets the preset detection condition, the multi-degree to-be-detected text-audio pair is written into the training database. If the multi-degree to-be-detected text-audio pair meets the preset detection condition, the multi-degree to-be-detected text-audio pair may be determined as the to-be-detected text-audio pair, and the multi-degree splicing text-audio pair may be determined as the splicing text-audio pair, and the process of screening the multi-degree splicing text-audio pair may be performed, until a text-audio pair that meets the requirement of writing into the training database is obtained, or when the splicing stop condition is reached, the text-audio pair is discarded.

The following description is given still following the above example. The case that the obtained first to-be-detected text-audio pair does not meet the requirement of writing into the training database T may exist. In this case, since the first to-be-detected audio segment of the first to-be-detected text-audio pair is composed of the first audio segment and the second audio segment, and the first to-be-detected text segment of the first to-be-detected text-audio pair is composed of the first text segment and the second text segment, the third text-audio pair $TA_3$ that may be spliced with the second text-audio pair $TA_2$ is selected as the multi-degree splicing text-audio pair, and the multi-degree splicing text-audio pair $TA_3$ is spliced with the first to-be-detected text-audio pair $(TA_1+TA_2)$ to obtain a multi-degree to-be-detected text-audio pair $(TA_1+TA_2+TA_3)$.

Further, it is determined that, the multi-degree to-be-detected audio segment of the multi-degree to-be-detected text-audio pair is composed of the first audio segment, the second audio segment and the third audio segment, and the multi-degree to-be-detected text segment of the multi-degree to-be-detected text-audio pair is composed of the first text segment, the second text segment and the third text segment. That is, the multi-degree to-be-detected text-audio pair is determined as having the audio segment of 6 s and the text segment of "我看了一场精彩的". Next, the multi-degree to-be-detected text-audio pair is detected. If the multi-degree to-be-detected text-audio pair meets the preset detection condition, the multi-degree to-be-detected text-audio pair is written into the training database T. In addition, if the multi-degree to-be-detected text-audio pair does not meet the preset detection condition, a text-audio pair that may be spliced with the third text-audio pair $TA_3$ is selected, and the splicing and detection process is performed on the text-audio pair. Alternatively, the multi-degree to-be-detected text-audio pair is discarded, and another text-audio pair is selected and the above process is performed on the another text-audio pair, to obtain the sample data that meets the requirement of writing into the training database T.

In summary, by the cyclic splicing, the balance of sample data in the training database can be ensured, which not only facilitates the use by the downstream business when training the model, but also improves the richness of the training database, thereby effectively ensuring the usage requirement of the downstream business.

With the sample generation method provided in the present disclosure, multiple text-audio pairs are acquired. For each text-audio pair among the multiple text-audio pairs, an audio feature of the audio segment of the text-audio pair is calculated, and a target text-audio pair and a splicing text-audio pair corresponding to the target text-audio pair are screened out from the multiple text-audio pairs according to the audio feature. Next, the target text-audio pair and the splicing text-audio pair are spliced into a to-be-detected text-audio pair, and the to-be-detected text-audio pair is detected. In a case that the to-be-detected text-audio pair meets a preset detection condition, the to-be-detected text-audio pair is written into a training database, so that the high-quality sample data that meets the usage requirement of the downstream business can be obtained by the splicing process in the sample data preparation stage, saving the resource consumption cost in the data preparation stage. Further, the amount of sample data written into the training database after the splicing process is large, which effectively solves the problem of the small amount of sample data for the downstream business and a poor speech synthesis effect that is caused due to the uneven distribution of audio lengths in the sample data, thereby improving the business processing efficiency of the downstream business.

Figure 5:
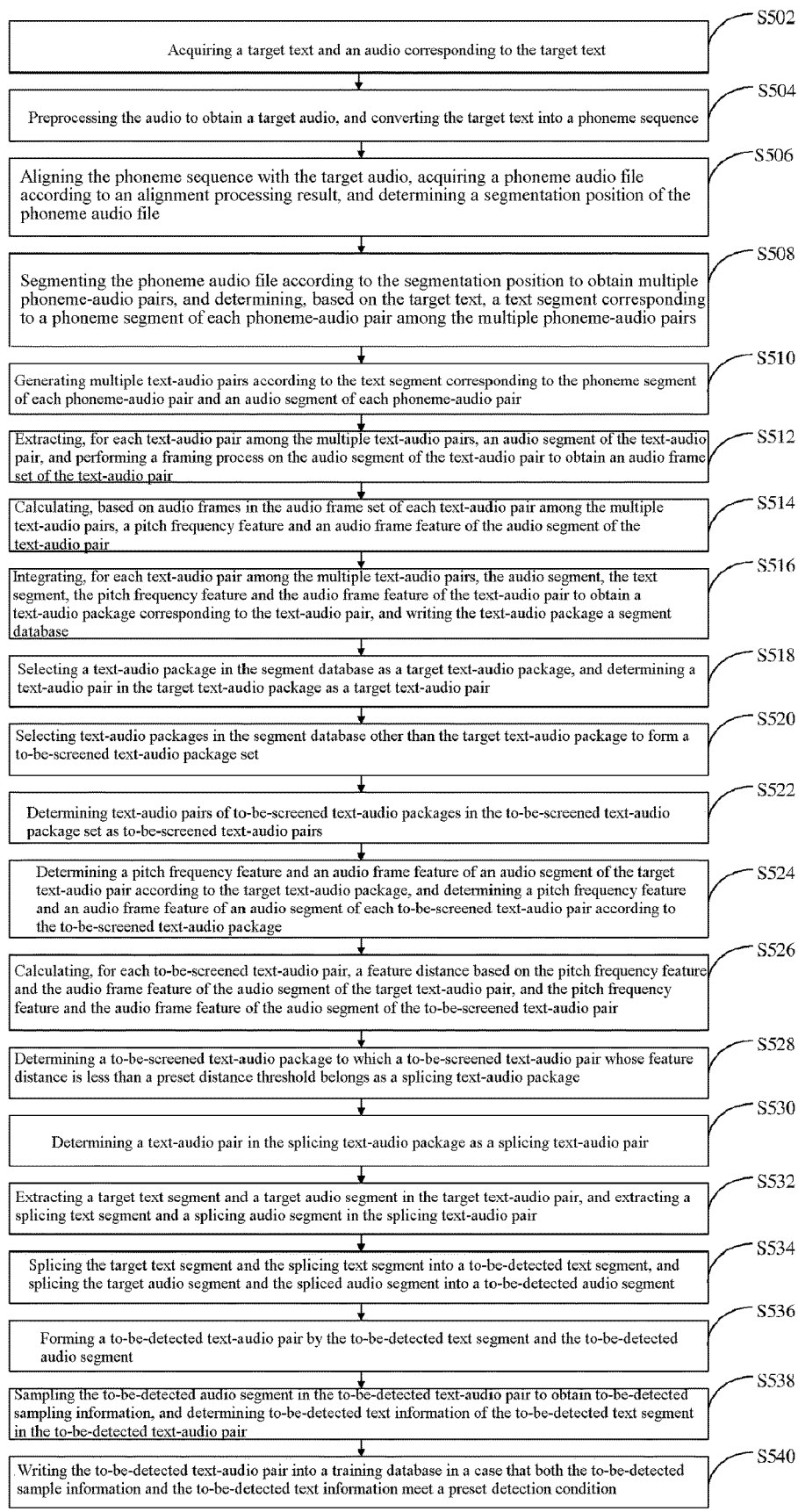
FIG. 5 is a flowchart of a sample generation method applied in a speech synthesis scenario according to an embodiment of present disclosure.
Figure 6:
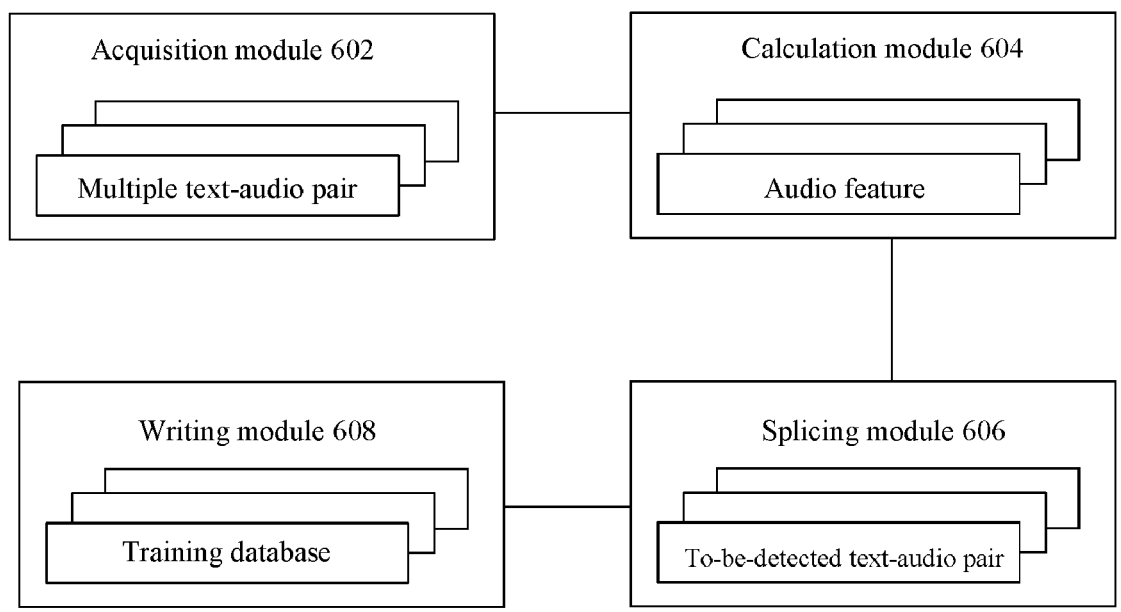
FIG. 6 is a schematic structural diagram of a sample generation device according to an embodiment of the present disclosure.

The sample generation method is further described below by taking an application of the sample generation method provided in present disclosure in a speech synthesis scenario as an example with reference to FIG. 5, which shows a flowchart of a sample generation method applied in a speech synthesis scenario according to an embodiment of present disclosure. The method includes the following steps S502 to S540.

In step S502, a target text and an audio corresponding to the target text are acquired.

In practical applications, in the end-to-end speech synthesis method based on a neural network, some high-quality sample data is required to be prepared before the model training due to the characteristics of this method, so as to train a speech synthesis model that meets the usage requirement. The sample data is generally required to be recorded in a professional recording studio, and is trimmed and sorted, to be used for training the model, which not only takes a lot of time to complete the data preparation, but also costs a lot. Further, due to the strict requirements for the sample data, there is less data that can be used to train the model, so that it is difficult to obtain the sample data with comprehensive coverage length and rhythm, resulting in problems of the speech synthesis such as a poor timbre quality and an unnatural rhythm (tone fluctuation). Therefore, how to generate high-quality and property-rich sample data in the sample data preparation stage is an urgent problem to be solved.

The sample generation method applied in the speech synthesis scenario is provided according this embodiment to solve the above problem.

In step S504, the audio is preprocessed to obtain a target audio, and the target text is converted into a phoneme sequence.

In step S506, the phoneme sequence is aligned with the target audio, a phoneme audio file is acquired according to an alignment processing result, and a segmentation position of the phoneme audio file is determined.

In step S508, the phoneme audio file is segmented according to the segmentation position to obtain multiple phoneme-audio pairs. Based on the target text, a text segment corresponding to a phoneme segment of each phoneme-audio pair among the multiple phoneme-audio pairs is determined.

In step S510, multiple text-audio pairs are generated according to the text segment corresponding to the phoneme segment of each phoneme-audio pair and an audio segment of each phoneme-audio pair.

In step S512, for each text-audio pair among the multiple text-audio pairs, an audio segment of the text-audio pair is extracted, and a framing process is performed on the audio segment of the text-audio pair to obtain an audio frame set of the text-audio pair.

In step S514, based on audio frames in the audio frame set of each text-audio pair among the multiple text-audio pairs, a pitch frequency feature and an audio frame feature of the audio segment of the text-audio pair are calculated.

In step S516, for each text-audio pair among the multiple text-audio pairs, the audio segment, the text segment, the pitch frequency feature and the audio frame feature of the text-audio pair are integrated to obtain a text-audio package corresponding to the text-audio pair, and the text-audio package is written a segment database.

In step S518, a text-audio package in the segment database is selected as a target text-audio package, and a text-audio pair in the target text-audio package is determined as a target text-audio pair.

In step S520, text-audio packages in the segment database other than the target text-audio package are selected to form a to-be-screened text-audio package set.

In step S522, text-audio pairs of to-be-screened text-audio packages in the to-be-screened text-audio package set are determined as to-be-screened text-audio pairs.

In step S524, a pitch frequency feature and an audio frame feature of an audio segment of the target text-audio pair are determined according to the target text-audio package, and a pitch frequency feature and an audio frame feature of an audio segment of each to-be-screened text-audio pair are determined according to the to-be-screened text-audio package.

In step S526, for each to-be-screened text-audio pair, a feature distance is calculated based on the pitch frequency feature and the audio frame feature of the audio segment of the target text-audio pair, and the pitch frequency feature and the audio frame feature of the audio segment of the to-be-screened text-audio pair.

In step S528, a to-be-screened text-audio package to which a to-be-screened text-audio pair whose feature distance is less than a preset distance threshold belongs is determined as a splicing text-audio package.

In step S530, a text-audio pair in the splicing text-audio package is determined as a splicing text-audio pair.

In step S532, a target text segment and a target audio segment in the target text-audio pair are extracted, and a splicing text segment and a splicing audio segment in the splicing text-audio pair are extracted.

In step S534, the target text segment and the splicing text segment are spliced into a to-be-detected text segment, and the target audio segment and the spliced audio segment are spliced into a to-be-detected audio segment.

In step S536, a to-be-detected text-audio pair is formed by the to-be-detected text segment and the to-be-detected audio segment.

In step S538, the to-be-detected audio segment in the to-be-detected text-audio pair is sampled to obtain to-be-detected sampling information, and to-be-detected text information of the to-be-detected text segment in the to-be-detected text-audio pair is determined.

In step S540, in a case that both the to-be-detected sample information and the to-be-detected text information meet a preset detection condition, the to-be-detected text-audio pair is written into a training database.

With the sample generation method provided in the present disclosure, the high-quality sample data that meets the usage requirement of the downstream business can be obtained by the splicing process in the sample data preparation stage, saving the resource consumption cost in the data preparation stage. Further, the amount of sample data written into the training database after the splicing process is large, which effectively solves the problem of the small amount of sample data for the downstream business and a poor speech synthesis effect that is caused due to the uneven distribution of audio lengths in the sample data, thereby improving the business processing efficiency of the downstream business.

Corresponding to the above method embodiments, a sample generation device is further provided according to an embodiment of the present disclosure. FIG. 5 is a schematic structural diagram of a sample generation device according to an embodiment of the present disclosure. As shown in FIG. 5, the device includes: an acquisition module 602, a calculation module 604, a splicing module 606, and a writing module 608.

The acquisition module 602 is configured to acquire multiple text-audio pairs, where each text-audio pair includes a text segment and an audio segment.

The calculation module 604 is configured to: calculate, for each text-audio pair among the multiple text-audio pairs, an audio feature of the audio segment of the text-audio pair, and screen out from the multiple text-audio pairs, according to the audio feature, a target text-audio pair and a splicing text-audio pair corresponding to the target text-audio pair.

The splicing module 606 is configured to: splice the target text-audio pair and the splicing text-audio pair into a to-be-detected text-audio pair, and detect the to-be-detected text-audio pair.

The writing module 608 is configured to write the to-be-detected text-audio pair into a training database in a case that the to-be-detected text-audio pair meets a preset detection condition.

In an optional embodiment, the acquisition module 602 is further configured to:
acquire a target text and an audio corresponding to the target text;
preprocess the audio to obtain a target audio, and convert the target text into a phoneme sequence; and
align the phoneme sequence with the target audio, and generate the multiple text-audio pairs according to an alignment processing result.

In an optional embodiment, the acquisition module 602 is further configured to:
acquire a phoneme audio file according to the alignment processing result, and determine a segmentation position of the phoneme audio file;
segment the phoneme audio file according to the segmentation position to obtain multiple phoneme-audio pairs, where each phoneme-audio pair includes a phoneme segment and an audio segment;
determine, based on the target text, a text segment corresponding to the phoneme segment of each phoneme-audio pair among the multiple phoneme-audio pairs; and
generate the multiple text-audio pairs according to the text segment corresponding to the phoneme segment of each phoneme-audio pair and the audio segment of each phoneme-audio pair.

In an optional embodiment, the calculation module 604 is further configured to: for each text-audio pair among the multiple text-audio pairs,
extract the audio segment of the text-audio pair, and perform a framing process on the audio segment of the text-audio pair, to obtain an audio frame set of the text-audio pair;
calculate, based on audio frames in the audio frame set of the text-audio pair, a pitch frequency feature and an audio frame feature of the audio segment of the text-audio pair; and
determine the audio feature of the audio segment of the text-audio pair according to the pitch frequency feature and the audio frame feature of the audio segment of the text-audio pair.

In an optional embodiment, the calculation module 604 is further configured to:
integrate, for each text-audio pair among the multiple text-audio pairs, the audio segment, the text segment and the audio feature of the text-audio pair to obtain a text-audio package corresponding to the text-audio pair, and write the text-audio package into a segment database;
select a text-audio package in the segment database as a target text-audio package, and determine a text-audio pair in the target text-audio package as the target text-audio pair; and
determine a splicing text-audio package based on text-audio packages in the segment database other than the target text-audio package and the audio feature, and determine a text-audio pair in the splicing text-audio package as the splicing text-audio pair.

In an optional embodiment, the calculation module 604 is further configured to:
select the text-audio packages in the segment database other than the target text-audio package to form a to-be-screened text-audio package set;
determine text-audio pairs of to-be-screened text-audio packages in the to-be-screened text-audio package set as to-be-screened text-audio pairs; and
screen out the splicing text-audio package from the to-be-screened text-audio package set based on an audio feature of an audio segment of the target text-audio pair and audio features of audio segments of the to-be-screened text-audio pairs.

In an optional embodiment, the calculation module 604 is further configured to:
determine a first audio feature of the audio segment of the target text-audio pair according to the target text-audio package, and determine, for each of the to-be-screened text-audio pairs, a second audio feature of the audio segment of the to-be-screened text-audio pair according to the to-be-screened text-audio package;
calculate a feature distance between the first audio feature and the second audio feature; and
determine a to-be-screened text-audio package to which a to-be-screened text-audio pair whose feature distance is less than a preset distance threshold belongs, as the splicing text-audio package.

In an optional embodiment, the sample generation device further includes: a sampling module. The sampling module is configured to: sample the audio segment of the target text-audio pair to obtain target sampling information, and determine target text information of the text segment of the target text-audio pair; and determine whether the target sampling information and the target text information meet the preset detection condition. In a case that the target sampling information and the target text information do not meet the preset detection condition, the splicing module 606 is triggered to operate.

In an optional embodiment, in a case that the target sampling information and the target text information meet the preset detection condition, the target text-audio pair is written into the training database.

In an optional embodiment, the splicing module 606 is further configured to:

extract a target text segment and a target audio segment of the target text-audio pair, and extract a splicing text segment and a splicing audio segment of the splicing text-audio pair;

splice the target text segment and the splicing text segment into a to-be-detected text segment, and splice the target audio segment and the splicing audio segment into a to-be-detected audio segment; and form the to-be-detected text-audio pair based on the to-be-detected text segment and the to-be-detected audio segment.

In an optional embodiment, the splicing module 606 is further configured to: sample the to-be-detected audio segment to obtain to-be-detected sampling information, and determine to-be-detected text information of the to-be-detected text segment; and detect the to-be-detected sampling information and the to-be-detected text information based on the preset detection condition. Correspondingly, the writing module 608 is further configured to: write the to-be-detected text-audio pair into the training database in a case that both the to-be-detected sampling information and the to-be-detected text information meet the preset detection condition.

In an optional embodiment, the sample generation device further includes: a screening module. The screening module is configured to: screen out a multi-degree splicing text-audio pair corresponding to the splicing text-audio pair from the multiple text-audio pairs according to the audio feature in a case that the to-be-detected text-audio pair does not meet the preset detection condition; and splice the multi-degree splicing text-audio pair and the to-be-detected text-audio pair into a multi-degree to-be-detected text-audio pair, and determine whether the multi-degree to-be-detected text-audio pair meets the preset detection condition. In a case that the multi-degree to-be-detected text-audio pair meets the preset detection condition, the multi-degree to-be-detected text-audio pair is written into the training database. In a case that the multi-degree to-be-detected text-audio pair does not meet the preset detection condition, the multi-degree splicing text-audio pair is determined as the splicing text-audio pair, the multi-degree to-be-detected text-audio pair is determined as the to-be-detected text-audio pair, and the screening module is triggered to operate.

In an optional embodiment, the sample generation device further includes: a training module. The training module is configured to:

extract a sample text-audio pair from the training database, where the sample text-audio pair includes a sample text segment and a sample audio segment; and train a speech synthesis model based on the sample text segment and the sample audio segment, to obtain a target speech synthesis model.

With the sample generation device provided in this embodiment, multiple text-audio pairs are acquired. For each text-audio pair among the multiple text-audio pairs, an audio feature of the audio segment of the text-audio pair is calculated, and a target text-audio pair and a splicing text-audio pair corresponding to the target text-audio pair are screened out from the multiple text-audio pairs according to the audio feature. Next, the target text-audio pair and the splicing text-audio pair are spliced into a to-be-detected text-audio pair, and the to-be-detected text-audio pair is detected. In a case that the to-be-detected text-audio pair meets a preset detection condition, the to-be-detected text-audio pair is written into a training database, so that the high-quality sample data that meets the usage requirement of the downstream business can be obtained by the splicing process in the sample data preparation stage, saving the resource consumption cost in the data preparation stage. Further, the amount of sample data written into the training database after the splicing process is large, which effectively solves the problem of the small amount of sample data for the downstream business and a poor speech synthesis effect that is caused due to the uneven distribution of audio lengths in the sample data, thereby improving the business processing efficiency of the downstream business.

The above gives a schematic solution of the sample generation device according to this embodiment. It should be noted that the technical solution of the sample generation device and the technical solution of the sample generation method belong to the same concept. For details that are not described in detail in the technical solution of the sample generation device, the description for the technical solution of the sample generation method may be referred to.

Figure 7:
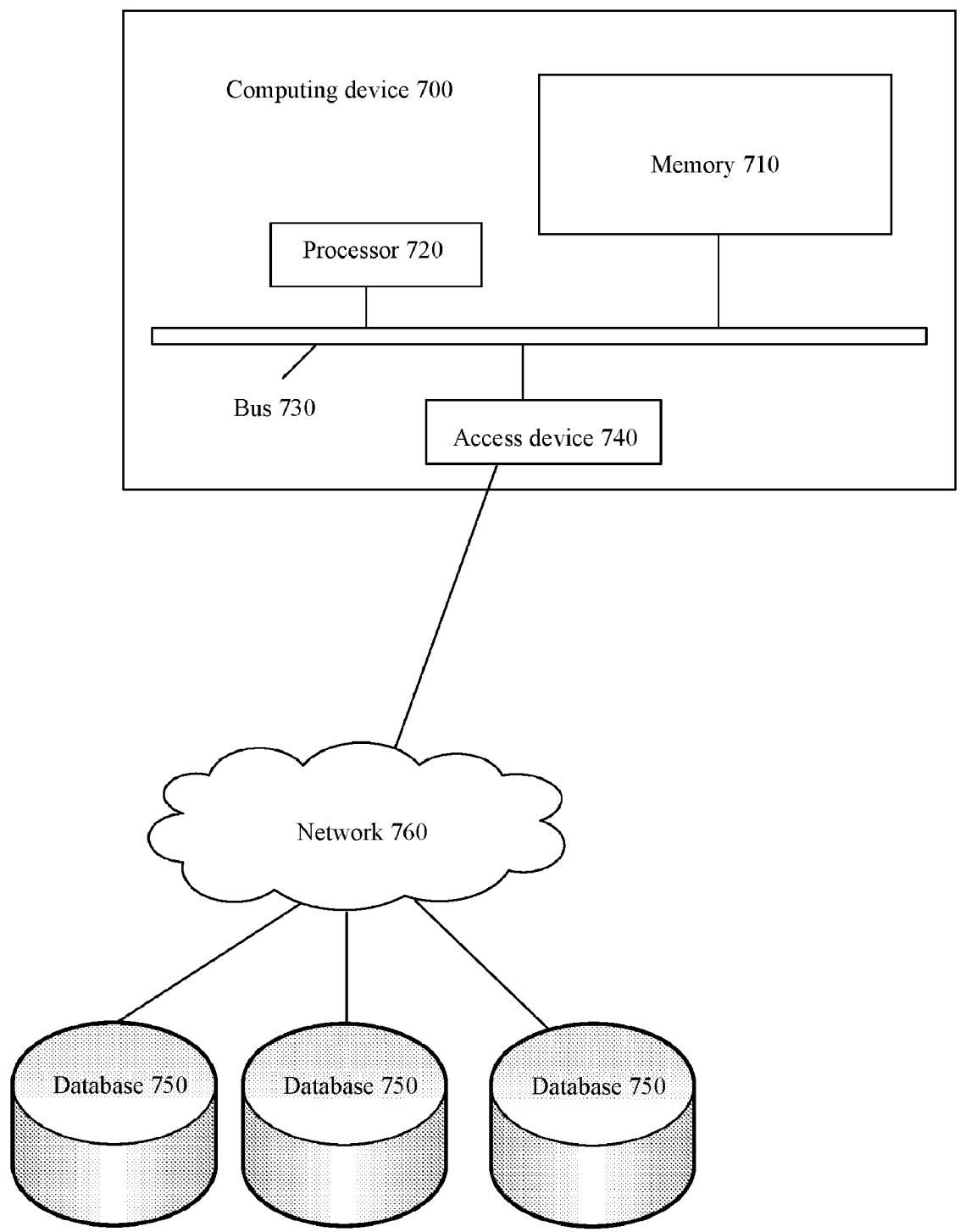
FIG. 7 is a structural block diagram of a computing device according to an embodiment of the present disclosure.

FIG. 7 is a structural block diagram of a computing device 700 according to an embodiment of the present disclosure. Components of the computing device 700 include but are not limited to, a memory 710 and a processor 720. The processor 720 is connected to the memory 710 via a bus 730. A database 750 is configured to store data.

The computing device 700 further includes an access device 740 by which the computing device 700 may communicate via one or more networks 760. Examples of the networks include a combination of a public switched telephone network (PSTN), a local area network (LAN), a wide area network (WAN), a personal area network (PAN), or a communication network such as the Internet. The access device 740 may include one or more of any type of wired or wireless network interfaces (e.g., a network interface card (NIC)), for example, an IEEE502.11 Wireless Local Area Network (WLAN) wireless interface, a World Interoperability for Microwave Access (Wi-MAX) interface, an Ethernet interface, a Universal Serial Bus (USB) interface, a cellular network interface, a Bluetooth interface, and a Near Field Communication (NFC) interface.

In an embodiment of the present disclosure, the above components of the computing device 700 and other components not shown in FIG. 7 may be connected to each other, for example, via a bus. It should be understood that the structural block diagram of the computing device shown in FIG. 7 is shown merely for the purpose of example, rather than limiting the scope of the present disclosure. Those skilled in the art may add or replace other components as required.

The computing device 700 may be any type of stationary or mobile computing device, including: mobile computers or mobile computing devices (e.g., a tablet computer, a personal digital assistant, a laptop computer, a notebook computer, or a netbooks), mobile phones (e.g., a smart phone), wearable computing devices (e.g., a smart watch, or a smart glass) or other types of mobile devices, or stationary computing devices such as a desktop computer or a PC. The computing device 700 may also be a mobile or stationary server.

The processor 720 is configured to execute the following computer executable instructions of:

acquiring multiple text-audio pairs, where each text-audio pair includes a text segment and an audio segment;

calculating, for each text-audio pair among the multiple text-audio pairs, an audio feature of the audio segment of the text-audio pair, and screening out from the multiple text-audio pairs, according to the audio feature, a target text-audio pair and a splicing text-audio pair corresponding to the target text-audio pair;

splicing the target text-audio pair and the splicing text-audio pair into a to-be-detected text-audio pair, and detecting the to-be-detected text-audio pair; and writing the to-be-detected text-audio pair into a training database in a case that the to-be-detected text-audio pair meets a preset detection condition.

The above gives a schematic solution of the computing device according to this embodiment. It should be noted that the technical solution of the computing device and the technical solution of the sample generation method belong to the same concept. For details that are not described in detail in the technical solution of the computing device, the description for the technical solution of the sample generation method may be referred to.

A computer readable storage medium is further provided according to an embodiment of the present disclosure. The storage medium stores a computer instruction that is executed by a processor to perform the steps of:

acquiring multiple text-audio pairs, where each text-audio pair includes a text segment and an audio segment;

calculating, for each text-audio pair among the multiple text-audio pairs, an audio feature of the audio segment of the text-audio pair, and screening out from the multiple text-audio pairs, according to the audio feature, a target text-audio pair and a splicing text-audio pair corresponding to the target text-audio pair;

splicing the target text-audio pair and the splicing text-audio pair into a to-be-detected text-audio pair, and detecting the to-be-detected text-audio pair; and writing the to-be-detected text-audio pair into a training database in a case that the to-be-detected text-audio pair meets a preset detection condition.

The above gives a schematic solution of the computer readable storage medium according to this embodiment. It should be noted that the technical solution of the storage medium and the technical solution of the sample generation method belong to the same concept. For details that are not described in detail in the technical solution of the storage medium, the description for the technical solution of the sample generation method may be referred to.

The specific embodiments of the present disclosure are described in the above. Other embodiments are all in the scope of the appended claims. In some cases, actions or steps recited in the claims may be performed in an order different from that described in the embodiments and still achieve desirable results. In addition, the process depicted in the drawings is not necessarily required to be performed in a shown particular order or a sequential order to achieve desirable results. In some implementations, multitask processing and parallel processing may be performed or may be advantageous.

The computer instruction includes a computer program code. The computer program code may be in the form of a source code, an object code or an executable file, or may be in an intermediate form. The computer readable medium may include: any entity or device capable of carrying the computer program code, a recording medium, a U disk, a mobile hard disk, a magnetic disk, an optical disk, a computer memory, a read-only memory (ROM, Read-Only Memory), a random access memory (RAM, Random Access Memory), an electric carrier signal, a telecommunication signal, a software distribution medium, and the like. It should be noted that the content contained in the computer readable medium may be appropriately added or removed according to requirements of legislation and patent practice in the jurisdiction. For example, in some jurisdictions, the computer readable medium does not include the electric carrier signal and the telecommunication signal according to the legislation and patent practice.

It should be noted that, the above method embodiments are all expressed as a combination of a series of actions for the convenience of description, and those skilled in the art should understand that the present disclosure is not limited by the described action order. In accordance with the present disclosure, some steps may be performed in other orders or simultaneously. In addition, those skilled in the art should further understand that the embodiments described in the present disclosure are all preferred embodiments, and not all the involved actions and modules are necessary.

In the above embodiments, the description for each embodiment has a particular emphasis. For a part that is not described in detail in a certain embodiment, reference may be made to the relevant descriptions of other embodiments.

The preferred embodiments of the present disclosure disclosed above are provided merely to set forth the present disclosure. Alternative embodiments are not intended to exhaust all details, and not intended to limit the present disclosure to only the described embodiments. Apparently, many modifications and variations may be made according to the content of the present disclosure. These embodiments are selected and described in the present disclosure to better explain the principles and practical applications of the present disclosure, so that those skilled in the art can well understand and utilize the present disclosure. The present disclosure is limited only by a full scope of the claims and equivalents thereof

What is claimed is:

1. A sample generation method, comprising:

acquiring a plurality of text-audio pairs, wherein each text-audio pair comprises a text segment and an audio segment;

calculating, for each text-audio pair among the plurality of text-audio pairs, an audio feature of the audio segment of the text-audio pair, and screening out from the plurality of text-audio pairs, according to the audio feature, a target text-audio pair and a splicing text-audio pair corresponding to the target text-audio pair;

splicing the target text-audio pair and the splicing text-audio pair into a to-be-detected text-audio pair, and detecting the to-be-detected text-audio pair; and writing the to-be-detected text-audio pair into a training database in a case that the to-be-detected text-audio pair meets a preset detection condition.

2. The sample generation method according to claim 1, wherein the acquiring a plurality of text-audio pairs comprises:
- acquiring a target text and an audio corresponding to the target text;
- preprocessing the audio to obtain a target audio, and converting the target text into a phoneme sequence; and
- aligning the phoneme sequence with the target audio, and generating the plurality of text-audio pairs according to an alignment processing result.

3. The sample generation method according to claim 2, wherein the generating the plurality of text-audio pairs according to an alignment processing result comprises:
- acquiring a phoneme audio file according to the alignment processing result, and determining a segmentation position of the phoneme audio file;
- segmenting the phoneme audio file according to the segmentation position to obtain a plurality of phoneme-audio pairs, wherein each phoneme-audio pair comprises a phoneme segment and an audio segment;
- determining, based on the target text, a text segment corresponding to the phoneme segment of each phoneme-audio pair among the plurality of phoneme-audio pairs; and
- generating the plurality of text-audio pairs according to the text segment corresponding to the phoneme segment of each phoneme-audio pair and the audio segment of each phoneme-audio pair.

4. The sample generation method according to claim 1, wherein the calculating, for each text-audio pair among the plurality of text-audio pairs, an audio feature of the audio segment of the text-audio pair comprises:
- for each text-audio pair among the plurality of text-audio pairs,
- extracting the audio segment of the text-audio pair, and performing a framing process on the audio segment of the text-audio pair, to obtain an audio frame set of the text-audio pair;
- calculating, based on audio frames in the audio frame set of the text-audio pair, a pitch frequency feature and an audio frame feature of the audio segment of the text-audio pair; and
- determining the audio feature of the audio segment of the text-audio pair according to the pitch frequency feature and the audio frame feature of the audio segment of the text-audio pair.

5. The sample generation method according to claim 1, wherein the screening out from the plurality of text-audio pairs, according to the audio feature, a target text-audio pair and a splicing text-audio pair corresponding to the target text-audio pair comprises:
- integrating, for each text-audio pair among the plurality of text-audio pairs, the audio segment, the text segment and the audio feature of the text-audio pair to obtain a text-audio package corresponding to the text-audio pair, and writing the text-audio package into a segment database;
- selecting a text-audio package in the segment database as a target text-audio package, and determining a text-audio pair in the target text-audio package as the target text-audio pair; and
- determining a splicing text-audio package based on text-audio packages in the segment database other than the target text-audio package and the audio feature, and determining a text-audio pair in the splicing text-audio package as the splicing text-audio pair.

6. The sample generation method according to claim 5, wherein the determining a splicing text-audio package based on text-audio packages in the segment database other than the target text-audio package and the audio feature comprises:
- selecting the text-audio packages in the segment database other than the target text-audio package to form a to-be-screened text-audio package set;
- determining text-audio pairs of to-be-screened text-audio packages in the to-be-screened text-audio package set as to-be-screened text-audio pairs; and
- screening out the splicing text-audio package from the to-be-screened text-audio package set based on an audio feature of an audio segment of the target text-audio pair and audio features of audio segments of the to-be-screened text-audio pairs.

7. The sample generation method according to claim 6, wherein the screening out the splicing text-audio package from the to-be-screened text-audio package set based on an audio feature of an audio segment of the target text-audio pair and audio features of audio segments of the to-be-screened text-audio pairs comprises:
- determining a first audio feature of the audio segment of the target text-audio pair according to the target text-audio package, and determining, for each of the to-be-screened text-audio pairs, a second audio feature of the audio segment of the to-be-screened text-audio pair according to the to-be-screened text-audio package;
- calculating a feature distance between the first audio feature and the second audio feature; and
- determining a to-be-screened text-audio package to which a to-be-screened text-audio pair whose feature distance is less than a preset distance threshold belongs, as the splicing text-audio package.

8. The sample generation method according to claim 1, wherein before the step of splicing the target text-audio pair and the splicing text-audio pair into the to-be-detected text-audio pair and detecting the to-be-detected text-audio pair, the method further comprises:
- sampling the audio segment of the target text-audio pair to obtain target sampling information, and determining target text information of the text segment of the target text-audio pair; and
- determining whether the target sampling information and the target text information meet the preset detection condition; wherein
- in a case that the target sampling information and the target text information do not meet the preset detection condition, the step of splicing the target text-audio pair and the splicing text-audio pair into the to-be-detected text-audio pair and detecting the to-be-detected text-audio pair is performed.

9. The sample generation method according to claim 8, wherein in a case that the target sampling information and the target text information meet the preset detection condition, the target text-audio pair is written into the training database.

10. The sample generation method according to claim 1, wherein the splicing the target text-audio pair and the splicing text-audio pair into a to-be-detected text-audio pair comprises:
- extracting a target text segment and a target audio segment of the target text-audio pair, and extracting a splicing text segment and a splicing audio segment of the splicing text-audio pair;
- splicing the target text segment and the splicing text segment into a to-be-detected text segment, and splicing the target audio segment and the splicing audio segment into a to-be-detected audio segment; and
forming the to-be-detected text-audio pair based on the to-be-detected text segment and the to-be-detected audio segment.

11. The sample generation method according to claim 10, wherein
the detecting the to-be-detected text-audio pair comprises:
sampling the to-be-detected audio segment to obtain to-be-detected sampling information, and determining to-be-detected text information of the to-be-detected text segment; and
detecting the to-be-detected sampling information and the to-be-detected text information based on the preset detection condition; and
the writing the to-be-detected text-audio pair into a training database in a case that the to-be-detected text-audio pair meets a preset detection condition comprises:
writing the to-be-detected text-audio pair into the training database in a case that both the to-be-detected sampling information and the to-be-detected text information meet the preset detection condition.

12. The sample generation method according to claim 1, wherein after the step of splicing the target text-audio pair and the splicing text-audio pair into the to-be-detected text-audio pair and detecting the to-be-detected text-audio pair, the method further comprises:
screening out a multi-degree splicing text-audio pair corresponding to the splicing text-audio pair from the plurality of text-audio pairs according to the audio feature in a case that the to-be-detected text-audio pair does not meet the preset detection condition; and
splicing the multi-degree splicing text-audio pair and the to-be-detected text-audio pair into a multi-degree to-be-detected text-audio pair, and determining whether the multi-degree to-be-detected text-audio pair meets the preset detection condition; wherein
in a case that the multi-degree to-be-detected text-audio pair meets the preset detection condition, the multi-degree to-be-detected text-audio pair is written into the training database; and
in a case that the multi-degree to-be-detected text-audio pair does not meet the preset detection condition, the multi-degree splicing text-audio pair is determined as the splicing text-audio pair, the multi-degree to-be-detected text-audio pair is determined as the to-be-detected text-audio pair, and the step of screening out the multi-degree splicing text-audio pair corresponding to the splicing text-audio pair from the plurality of text-audio pairs according to the audio feature is performed.

13. The sample generation method according to claim 1, wherein after the step of writing the to-be-detected text-audio pair into the training database, the method further comprises:
extracting a sample text-audio pair from the training database, wherein the sample text-audio pair comprises a sample text segment and a sample audio segment; and
training a speech synthesis model based on the sample text segment and the sample audio segment, to obtain a target speech synthesis model.

14. A computer readable storage medium storing a computer instruction that is executed by a processor to perform the steps of the sample generation method according to claim 1.

15. A sample generation device, comprising:
an acquisition module, configured to a plurality of text-audio pairs, wherein each text-audio pair comprises a text segment and an audio segment;
a calculation module, configured to calculate, for each text-audio pair among the plurality of text-audio pairs, an audio feature of the audio segment of the text-audio pair, and screening out from the plurality of text-audio pairs, according to the audio feature, a target text-audio pair and a splicing text-audio pair corresponding to the target text-audio pair;
a splicing module, configured to splice the target text-audio pair and the splicing text-audio pair into a to-be-detected text-audio pair, and detect the to-be-detected text-audio pair; and
a writing module, configured to write the to-be-detected text-audio pair into a training database in a case that the to-be-detected text-audio pair meets a preset detection condition.

16. A computing device, comprising:
a memory configured to store a computer executable instruction; and
a processor configured to execute the computer executable instruction to perform a method comprising the following steps of:
acquiring a plurality of text-audio pairs, wherein each text-audio pair comprises a text segment and an audio segment;
calculating, for each text-audio pair among the plurality of text-audio pairs, an audio feature of the audio segment of the text-audio pair, and screening out from the plurality of text-audio pairs, according to the audio feature, a target text-audio pair and a splicing text-audio pair corresponding to the target text-audio pair;
splicing the target text-audio pair and the splicing text-audio pair into a to-be-detected text-audio pair, and detecting the to-be-detected text-audio pair; and
writing the to-be-detected text-audio pair into a training database in a case that the to-be-detected text-audio pair meets a preset detection condition.

* * * * *